US008682389B2

(12) United States Patent
Siomina et al.

(10) Patent No.: US 8,682,389 B2
(45) Date of Patent: Mar. 25, 2014

(54) METHODS AND APPARATUS FOR POSITIONING MEASUREMENT IN MULTI-ANTENNA TRANSMISSION SYSTEMS

(75) Inventors: Iana Siomina, Solna (SE); Yngve Selen, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 377 days.

(21) Appl. No.: 13/120,030

(22) PCT Filed: Mar. 10, 2011

(86) PCT No.: PCT/SE2011/050266
§ 371 (c)(1),
(2), (4) Date: Mar. 21, 2011

(87) PCT Pub. No.: WO2011/139201
PCT Pub. Date: Nov. 10, 2011

(65) Prior Publication Data
US 2012/0231809 A1    Sep. 13, 2012

Related U.S. Application Data

(60) Provisional application No. 61/330,562, filed on May 3, 2010.

(51) Int. Cl.
*H04M 1/38* (2006.01)
(52) U.S. Cl.
USPC ........................................ 455/556.1; 370/338
(58) Field of Classification Search
USPC ....................................................... 455/556.1
See application file for complete search history.

(56) References Cited

U.S. PATENT DOCUMENTS

2010/0317343 A1*  12/2010  Krishnamurthy et al. .  455/435.1

FOREIGN PATENT DOCUMENTS

| WO | 2010144765 A1 | 12/2010 |
| WO | 2011020008 A2 | 2/2011 |
| WO | 2011021974 A1 | 2/2011 |

OTHER PUBLICATIONS

Nortel: "Discussions on UE Positioning Issues", 3GPP Draft: R1-091911 (Nortel-Discuss-UE-Position), 3rd Generation Partnership Project (3GPP), Mobile Competence Center, 650, Route Des Lucioles; F-06921 Sophia-Antipolis Cedex France, No. San Francisco, USA; May 5, 2009; XP050339399 [retrieved on May 5, 2009] paragraphs [0001], [03.1], [0005] figures, 1,2.

(Continued)

*Primary Examiner* — Marcos Batista
(74) *Attorney, Agent, or Firm* — Coats & Bennett, PLLC

(57) ABSTRACT

This document discloses solutions for using a mix of reference signal types in a wireless communications network, e.g., a first type and a second type, in making positioning-related measurements. In one example, a UE uses a "mix" of CRS and PRS. As an example case, a UE receives PRS and, possibly, CRS from one or more cells, while it receives only CRS from one or more other cells. In this case, the UE determines, e.g., received signal timing values for CRS as received from some cells, on a per-cell basis, and for PRS as received from other cells, on a per-cell basis. The UE can measure and report on per-signal/per-cell basis and can perform calculations involving a mix of timing measurements made for both CRS and PRS. In a further aspect, reference signal transmissions are controlled or coordinated on a per-port basis in cells that use multiple antenna ports for transmitting within each such cell.

37 Claims, 11 Drawing Sheets

(56) References Cited

OTHER PUBLICATIONS

Qualcom Europe, "Consideration on Positioning Simulations", 3GPP Draft, R4-093732 Considerations on Positioning Simulations, 3rd Generation Partnership Oroject (3GPP) Mobile Competence Centre; 650 Route Des Lucioles; F-06921 Sophia-Antipolis Cedes, France; No. Miyazaki; Oct. 12, 2009, XP050363330, [retrieved on Oct. 6, 2009] paragaphs [0002], [0003].

Huawei: "Discussion on the accuracy requirement for LTE positioning support", 3GPP Draft: R4-092295_Positioning_Accuracy_Requirement, 3rd Generation Partnership Project (3GPP) Mobile Competence Centre; 650 Route Des Lucioles; F-06921 Sophia-Antipolis Cedes, France, No. Los Angeles, CA, Jun. 25, 2009, XP050353538 (retreived on Jun. 25, 2009) paragraph [003].

Motorola: "Revision of simulation results for OTDOA positioning with partially-alligned positioning subframes", 3GPP Draft: R4-094956, 3rd Generation Partnership Project (3GPP) Mobile Competence Centre; 650 Route Des Lucioles; F-06921 Sophia-Antipolis Ceces, France, No. Jeju: Nov. 9, 2009, XP050394408 [retrieved on Nov. 17, 2009] the whole document.

Motorola: Improving PRS Herability by Time-Offsetting PRS Subframes, 3GPP Draft; R4-101323—Improving PRS Hearability by Time-Offsetting PRS Subframes, 3rd Generation Partnership Project (3GPP) Mobile Competence Centre; 650 Route Des Lucioles; F-06921 Sophia-Antipolis Cedes, France; vol. RAN WG4, No. Dublin; Apr. 12, 2010 Apr. 9, 2010, XP050427436 [retrieved on Apr. 9, 2010], paragraphs [0001], [0002], [Annex A] [Annex B].

Qualcomm Incorporated et al: "Way Forawrd on Autonomous Muting", 3GPP Draft; R4-101503, 3rd Generation Partnership Project (3GPP) Mobile Competence Centre; 650 Route Des Lucioles; F-06921 Sophia-Antipolis Cedes, France, vol. RAN WG4, no Dublin: Apr. 12, 2010 Apr. 20, 2010, XP050427627 [retrieved on Apr. 20, 2010] paragraph [0002].

Ericsson et al: "Signalling support for PRS muting in OTDOA", 3GPP Draft: R2-103413, 3rd Generation Partnership Project (3GPP) Mobile Competence Centre; 650 Route Des Lucioles; F-06921 Sophia-Antipolis Cedes, France; vol. RAN WG2 No. Montral, Canada May 10, 2010, May 15, 2010, XP050423461 [retrieved on May 15, 2010] whole document.

* cited by examiner

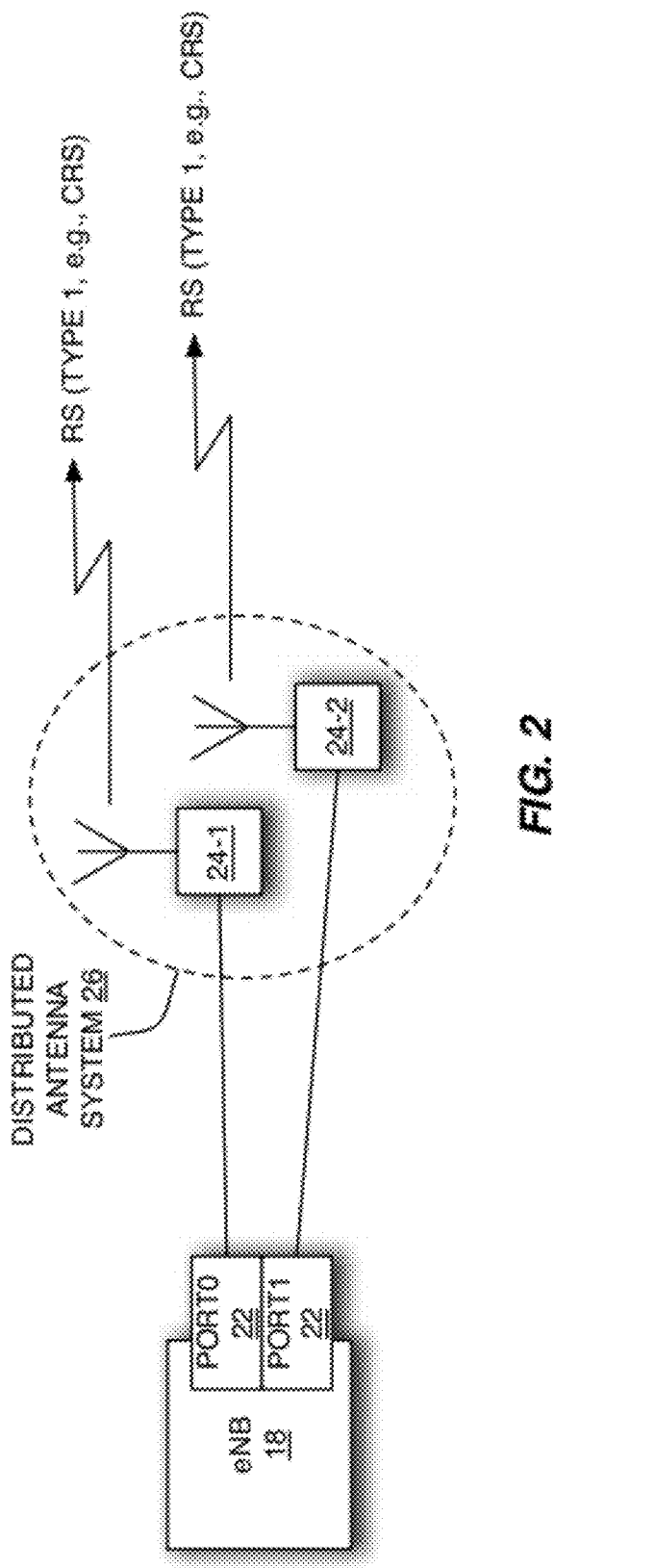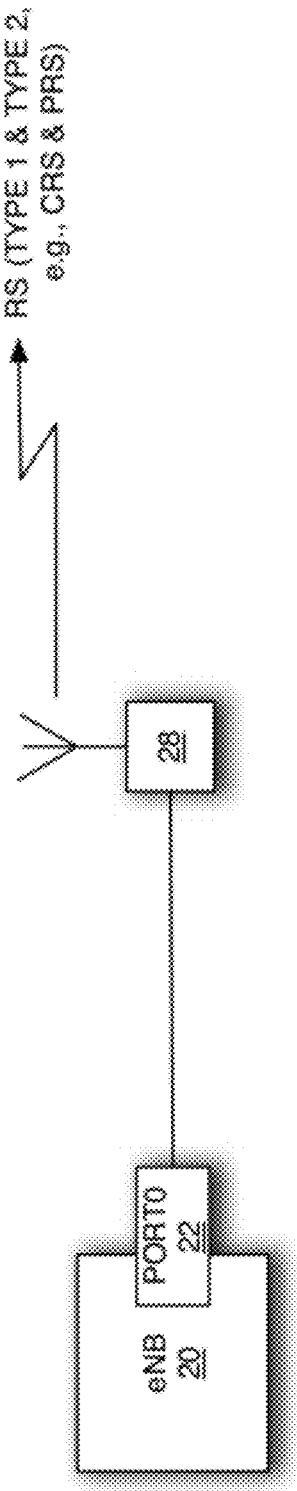

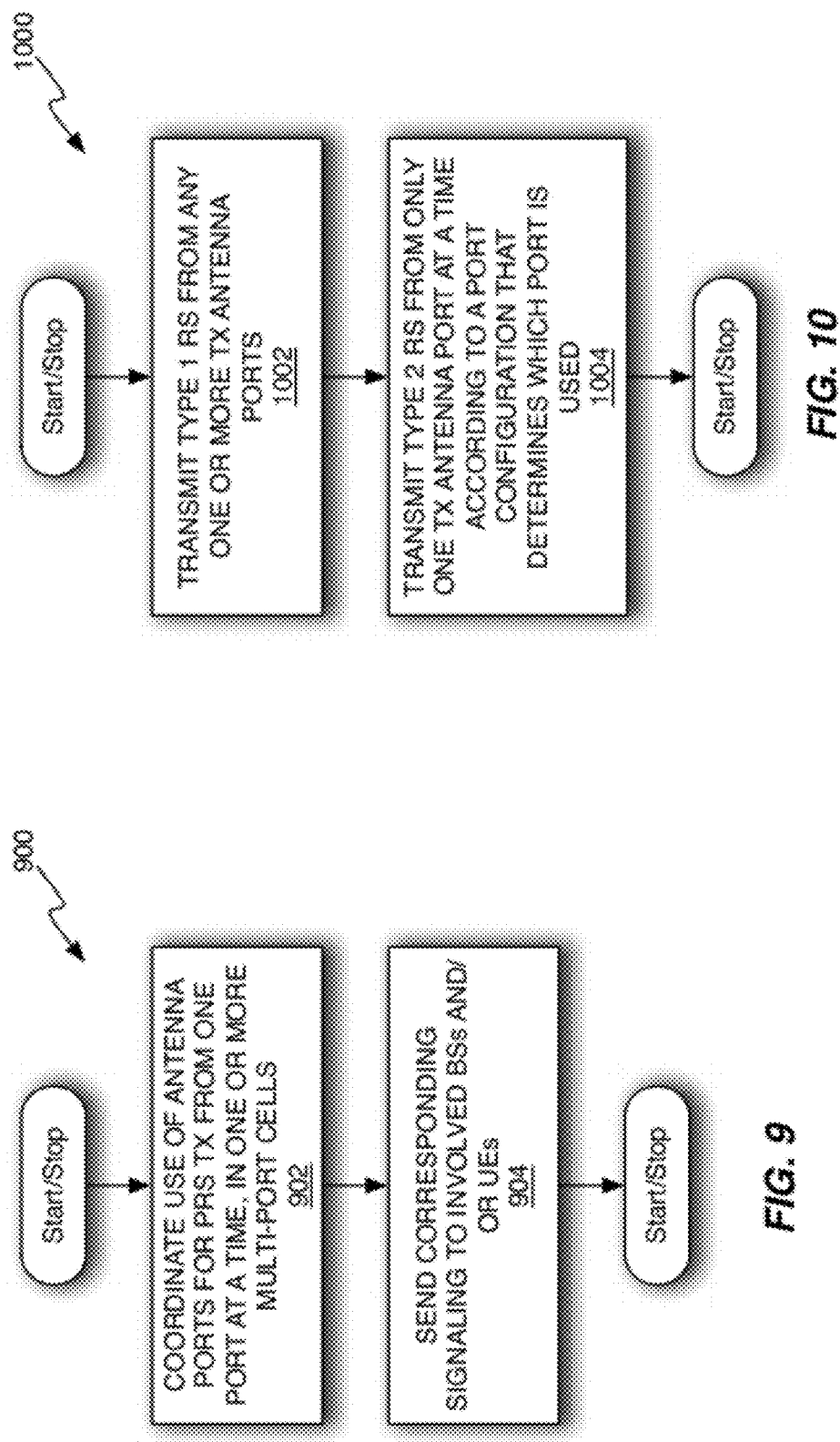

METHODS AND APPARATUS FOR POSITIONING MEASUREMENT IN MULTI-ANTENNA TRANSMISSION SYSTEMS

RELATED APPLICATIONS

This application claims priority from the U.S. provisional patent application filed on 3 May 2010 and assigned Application No. 61/330,562, and also from the International patent application filed on 10 Mar. 2011 and assigned Application No. PCT/SE2011/050266, both of which are incorporated herein by reference.

FIELD OF THE INVENTION

The present invention generally relates to positioning measurements in wireless communication networks, such as based on observed-time-difference-of-arrival (OTDOA) measurements made with respect to multiple signal sources, and particularly relates to such measurements in systems that use multi-antenna transmitters, such as in the use of multiple transmit antenna ports within given network cells.

BACKGROUND

Positioning and the location-based services (LBS) enabled by accurate positioning determinations are of significant and growing interest in the context of wireless communication networks and their associated subscriber devices, for technical, commercial, and safety-related reasons. Example applications include location-aware social networking applications, advertising applications, and navigation and traffic assistance, along with critical emergency services like E911 in the United States and similar emergency positioning services used elsewhere.

Different services have different accuracy and timing requirements. In many environments, the position of a radio transceiver such as a subscriber terminal can be accurately estimated by using positioning methods based on GPS (Global Positioning System). Many communication networks also provide positioning assistance to subscriber terminals, referred to as User Equipment or UEs in the plural sense. Such positioning assistance enables terminals to perform measurements at lower receiver sensitivity levels and improves the "start up" performance of GPS receivers, referred to as Assisted-GPS positioning or A-GPS.

GPS or A-GPS receivers, however, are not available in all wireless terminals and GPS-based positioning therefore cannot be relied upon in a universal sense with respect to positioning terminals in a wireless communication network. As a further complication, GPS works poorly or not at all in indoor environments and likewise experiences severe problems in urban canyons. A complementary terrestrial positioning method, called Observed Time Difference of Arrival (OTDOA), is therefore being standardized by 3GPP.

With OTDOA, a terminal or other UE measures the timing differences for downlink reference signals received from multiple distinct locations. For each measured neighbor cell, the UE measures Reference Signal Time Difference (RSTD) which is the relative timing difference between signals received from the neighbor cell and the reference cell. The UE position estimate is then found as the intersection of hyperbolas corresponding to the measured RSTDs. At least three measurements from geographically dispersed base stations with a good geometry are needed to solve for two position coordinates of the terminal and the receiver clock bias. Solving for the terminal location requires precise knowledge of the transmitter locations and the corresponding transmit timing offsets.

OTDOA positioning calculations are carried out in the terminals in UE-based positioning solutions, or are carried out in the network with assistance from the UEs in UE-assisted positioning solutions. As an example, the network includes a positioning server that determines UE locations based on RSTD measurements carried out by the UEs and/or the network radio nodes, such as base stations within the network. In Long Term Evolution (LTE) networks, the positioning server may be represented by, e.g., Enhanced Serving Mobile Location Centers (E-SMLCs) or SUPL Location Platforms (SLP) providing positioning services.

To enable positioning in LTE and facilitate positioning measurements of a proper quality and for a sufficient number of distinct locations, new physical signals dedicated for positioning have been introduced. These signals are referred to as positioning reference signals or PRS and low-interference positioning subframes are specified in 3GPP for their transmission, where the low-interference positioning subframes are subframes characterized by, e.g., no or reduced PDSCH transmission activity from radio nodes, to thereby improve the quality of PRS reception and processing at receivers. PRS are transmitted with a pre-defined periodicity of 160, 320, 640 or 1280 ms.

PRS are transmitted from one antenna port—the "R6" port—according to a pre-defined pattern, which may be based on timing. For more information, see 3GPP TS 36.211, *Evolved Universal Terrestrial Radio Access (E-UTRA); Physical Channels and Modulation*. A frequency shift, which is a function of Physical Cell Identity (PCI) can be applied to the specified PRS patterns to generate orthogonal patterns that provide an effective frequency reuse of six. That high reuse factor significantly reduces neighbor cell interference on the measured PRS and thus improves positioning measurements. While positioning measurements could be made for other types of reference signals might be used for positioning, PRS have been specifically designed for positioning measurements and in general are characterized by better signal quality than other reference signals.

Even so, PRS-based positioning measurements can be challenging. For example, for OTDOA-based positioning, the UE measures PRS from multiple distinct locations—e.g., each one of three or more base stations providing service within a group of neighboring cells. With each base station occupying a different location relative to the UE, the PRS from one or more of the base stations may be much weaker than those received by the UE from the UE's serving cell. Furthermore, the UE must perform blind searching unless it has knowledge of at least the approximate arrival time for the PRS and the exact pattern and thus the signal sequence used for PRS transmission.

To ease the search burden, the network can transmit positioning assistance data. Such data includes reference cell information, neighbor cell lists containing PCIs of neighbor cells, the number of consecutive downlink subframes used for PRS transmission within the defined PRS transmission occasions, the transmission bandwidth used for PRS, the frequencies and bands where PRS are transmitted, etc.

As a further limitation, the standard provides for transmission of PRS from a single antenna port, which is at odds with the use of multiple antenna ports for transmission within a given cell. Multiple antenna ports are used, for example, in distributed antenna systems (DAS). Such systems include the case where multiple antennas are coupled to the same feeder cable, systems with remote radio heads (RRH), as well as the more sophisticated example of Coordinated MultiPoint (CoMP) transmission systems in which a number of geographically separated antennas/transmitters are used to provide better coverage within a cell.

At the UE, PRSs transmitted within the same measurement interval are distinguished by the applied PRS pattern. PRS patterns are a function of PCI, and the ability to differentiate between the PRS from different cells thus holds. However, measurement ambiguity would arise at the UE if a given cell simultaneously transmitted the same PRS from more than one physical antenna port at a time, since the UE would not be able to distinguish the signals transmitted simultaneously from more than one antenna port associated with the same PCI Similar problems arise in relay-augmented cells because the relays may not form their own cells and instead simply provide improved coverage within a donor cell. Thus, to the extent that the relay would retransmit the same PRS as being transmitted by the eNodeB or other base station of the donor cell, measurement ambiguity would arise at UEs simultaneously receiving the same PRS from the relay node and base station. While per-antenna IDs for PRS would solve the ambiguity problem, their use is impractical in view of the number of non-overlapping IDs available in current cell ID schemes, which are not designed specifically for facilitating positioning with PRS.

In contrast to the above PRS ambiguity, CRS may be transmitted from multiple antenna ports. However, measurement quality is typically lower when CRS is used for positioning measurement while being transmitted from more than one port, because CRS transmitted from two antenna ports within a cell, which is a typical case, has an effective frequency reuse of three, whilst PRS have been designed for frequency reuse of six. Further, CRS may be not available in the low-interference subframes intended for PRS, e.g., when Multicast-Broadcast Single Frequency Network (MBSFN) subframes are configured as positioning subframes. Consequently, CRS-based positioning measurements would necessarily need to be performed outside of the low-interference subframes, which degrades the quality of those measurements due to the interference from, e.g., data transmissions.

Here, note that if PRS are permanently not configured for transmission in a cell, then the positioning configuration information element is likely to not be included in the assistance data for the corresponding cell, which excludes the possibility of measuring CRS in low-interference positioning subframes, even when non-MBSFN subframes are configured as positioning subframes.

SUMMARY

This disclosure provides solutions for using a mix of reference signal types, e.g., a first type and a second type, in making positioning-related measurements. In one example, a UE uses a "mix" of CRS and PRS. As an example case, a UE receives, where the receiving includes measuring, PRS and, possibly, CRS from one or more cells, while it receives only CRS from one or more other cells. In this case, the UE determines, e.g., received signal timing values for CRS as received from some cells, on a per-cell basis, and for PRS as received from other cells, on a per-cell basis. The UE can measure and report on a per-signal/per-cell basis and can perform calculations involving a mix of timing measurements made for both CRS and PRS.

In another example case, such as where a given cell is served via transmissions from multiple antenna ports, a UE receives CRS from any one or more of the antenna ports, but receives PRS from only one of the ports at a time. Here, the UE performs per-antenna CRS and PRS measurements, and in one or more embodiments is configured to report such measurements for the cell on a per-port basis. In the same or other embodiments, the UE determines received signal timing differences with respect to a plurality of antenna ports in a given cell, using a mix of CRS-based and PRS-based positioning related measurements.

As such, one embodiment disclosed herein comprises a method of performing positioning-related measurements in a wireless communication apparatus associated with a wireless communication network. The network includes one or more first cells each transmitting a first type of reference signal but not a second type of reference signal. The network further includes one or more second cells each transmitting at least the second type of reference signal. As an example, the first type of reference signal is CRS and the second type is PRS.

According to the method, the wireless communication apparatus receives a mix of reference signals, including one or more reference signals of the first type from one or more of the first cells, and one or more of the second type of reference signals from one or more of the second cells. Correspondingly, the apparatus performs positioning-related measurements using the mix of reference signals. The first type of reference signal can be transmitted without positioning-related measurement ambiguity from more than one antenna port at a time within any given cell, while said second type of reference signal can be transmitted without positioning-measurement ambiguity from only one antenna port at a time within any given cell. For example, the first type of reference signal is CRS and the second type of reference signal is PRS.

In another embodiment, a wireless communication network comprises one or more first base stations, each first base station having multiple antenna ports for providing network service in a corresponding cell, and one or more second base stations, each second base station having a single antenna port for providing service in a corresponding cell. Each of the first base stations is configured to transmit a first type of reference signal but not a second type of reference signal, and each of the second base stations is configured to transmit both the first and the second types of reference signals. In an example case, the network includes multi-port base stations which are configured not to transmit only reference signals of the first type, and single-port base stations which are configured to transmit reference signals of the first and second types.

In another embodiment, a method of reference signal transmission in a wireless communication network base station includes transmitting, in a cell associated with the base station, a first type of reference signal from any one or more of antenna ports in a plurality of antenna ports used for transmitting in the cell. The method further includes transmitting, in the cell, a second type of reference signal from only one of the antenna ports at a time according to a port configuration that determines which one of the antenna ports is selected for use in transmitting the second type of reference signal at any given one of the transmission occasions that are defined for transmission of the second type of reference signal. Again, the first type of reference signal may be CRS and the second type may be PRS, and the port configuration may be dynamically configured, for example. In this manner, the base station dynamically switches which antenna port is used for PRS transmission, according to a defined pattern, e.g., timing or sequence.

In a corresponding embodiment, a method of performing positioning-related measurements in a wireless communication apparatus comprises receiving a first type of reference signal that is transmitted from more than one antenna port at a time within a cell, where a plurality of antenna ports are used for transmitting in the cell. The method further includes receiving a second type of reference signal that is transmitted from only one antenna port at a time within the cell, and making positioning-related measurements with respect to the first and second types of reference signals for the cell, on a per-port basis.

In yet another embodiment, a method of controlling positioning reference signal transmission from multiple antenna ports within each of one or more cells of a wireless communication network is based on a positioning node coordinating the use of antenna ports for transmission of positioning reference signals, for cells in the wireless communication network that are served using more than one antenna port. The controlling may also be implemented using coordinated multi-antenna muting. The method also includes sending corresponding signaling to at least one of: the base stations involved in such coordination, and the wireless communication apparatuses that are or will measure the reference signals transmitted in the cells.

Of course, the present invention is not limited to the above brief summary of example features and advantages. Those skilled in the art will appreciate further features and advantages upon reading the detailed disclosure and viewing the accompanying drawings.

BRIEF DESCRIPTION OF THE DRAWINGS

FIGS. 2 and 3 are block diagrams of one embodiment of a multi-port and single-port base station, respectively, for use in the wireless communication network of FIG. 1.

FIG. 9 is a block diagram of one embodiment of a method for centralized control of reference signal transmissions, such as may be implemented by the centralized reference signal controller of FIG. 8.

FIG. 10 is a block diagram of one embodiment of a method of transmitting reference signals of first and second types from a number of antennas used for transmission by a multi-port base station.

DETAILED DESCRIPTION

Before providing example details, it should be understood by the skilled in the art that "UE" as used herein is a non-limiting term which means any wireless device or node (e.g., cellular phone or smartphone, PDA, laptop, mobile, sensor, fixed relay, mobile relay or even a small base station that is being positioned when timing measurements for positioning are considered, i.e. a LCS target in general). The teachings herein apply both for UEs that are or are not capable of performing inter-frequency, inter-band or inter-RAT positioning measurements.

Further, it will be appreciated that a "cell" is associated with a radio node, where a radio node comprises in a general sense any node transmitting radio signals that may be used for positioning, measurements. Non-limiting example radio nodes include eNodeB, macro/micro/pico base station, home eNodeB, relay, beacon device, or repeater.

Still further, a "positioning node," such as described in different embodiments herein, is a node with positioning functionality. For example, for LTE-based networks, a positioning node may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. In a testing environment at least, a positioning node may be simulated or emulated by test equipment.

"Positioning-related measurements" are used for determining position. In one or more examples, performing positioning-related measurements comprises determining received signal timing—i.e., making timing measurements such as time of arrival (TOA) and/or time-difference-of arrival (TDOA) or reference signal time difference (RSTD) measurements. In one advantageous aspect of the teachings herein, positioning-related measurements may be made using a mix of reference signal types—e.g., timing differences may be determined between a PRS and a CRS, or between other types of reference signals.

Figure 1:
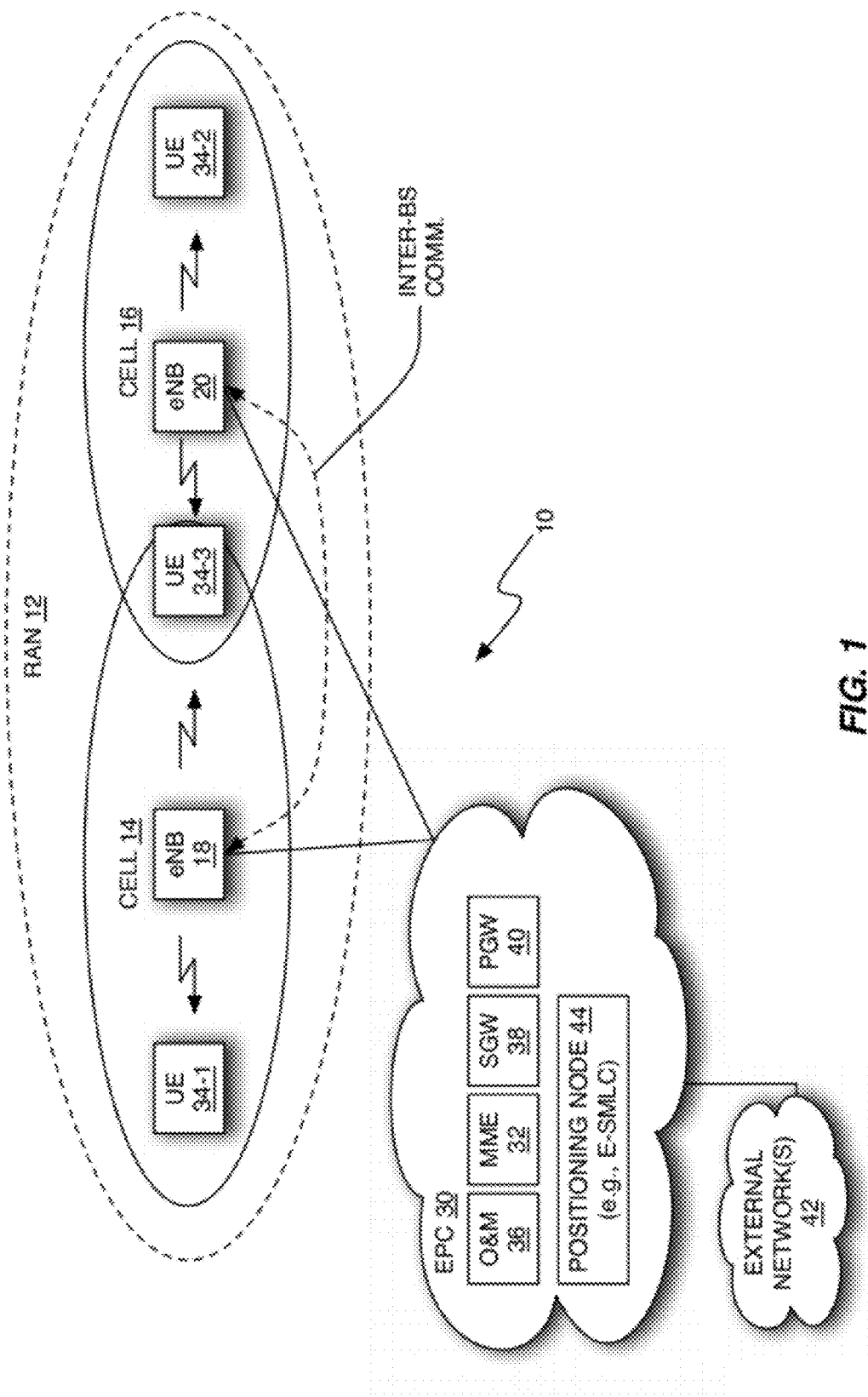
FIG. 1 is a block diagram of a wireless communication network configured according to one or more embodiments disclosed herein.

With the above points in mind, FIG. 1 illustrates a wireless communication network 10 that includes a Radio Access Network (RAN) 12 that includes one or more cells 14 and one or more cells 16. Base stations 18 provide service within respective ones of the cells 14 and base stations 20 provide service within respective ones of the cells 16. The base stations 18 and 20 generally are of the same type, e.g., they are eNodeBs configured for operation in a Long Term Evolution (LTE) network. However, different reference numbers are used to differentiate between cells 14 that are served by base stations 18 that transmit from multiple antenna ports, versus cells 16 that are served by base stations 20 that transmit from a single antenna port.

As a non-limiting example, one or more of the base stations 18 each transmit in a respective cell 14 from a distributed antenna system. In a given such cell 14, each antenna port is associated with a different antenna and the different antennas of the distributed antenna system are placed at different locations within the cell 14.

See FIG. 2 for one embodiment of this example. The base station 18—labeled as an eNodeB for the LTE context—transmits from two antenna ports 22, labeled as Port 0 and Port 1. Each port 22 is associated with a respective antenna 24 in a distributed antenna system 26. The depicted distributed antenna system 26 includes two antennas, labeled as 24-1 and 24-2.

FIG. 3 illustrates an example single-port case, wherein a base station 20 transmits using one antenna port 22, e.g., Port 0, from a single transmit antenna 28. Of course, these are to be understood as example cases and other multi-port antenna configurations can be used for base stations 18 and their corresponding cells 14, and other single-port antenna configurations can be used for base stations 20 and their corresponding cells 16.

Turning back to FIG. 1, the network 10 further includes a core network 30, which in the LTE example case is an Evolved Packet Core (EPC) network. The core network 30 includes a mobility management entity (MME) 32 that provides for idle-mode tracking and paging of user equipment (UEs) 34 operating within the network 10. FIG. 1 depicts only a few UEs 34-1, 34-2, and 34-3, for simplicity. The core network 30 also includes an operations and maintenance (O&M) node 36, and a serving gateway (SGW) 38. The SGW 38 routes and forwards user data packets to the UEs 34, and also acts as a mobility anchor in the user plane for inter-base-station handovers. SGW is typically used for user-plane positioning, whilst in control-plane positioning the packets are typically delivered via MME, transparently to MME.

Further, a PDN gateway (PGW) 40 provides connectivity between the UEs 34 and external packet data networks 42, such as the Internet. One also sees a positioning node 44, such as an E-SMLC in the LTE example case. The positioning node 44 supports UE positioning for emergency and non-emergency location-based services (LCS). In general terms, the geographic position of a given UE 34 can be determined based on measuring radio signals to or from the UE 34, with the determined position reported in standardized formats relating to cell and/or geographic coordinate position, along with an estimate of the uncertainty.

In an example involving "UE-assisted" positioning, the positioning node 44 sends a positioning request to UEs transparently to MME 32—as used here, "transparently" means that the MME and base stations do not know the contents of the LPP PDUs. That request includes an LTE Positioning Protocol (LPP) Protocol Data Unit (PDU), which, as an example, requests the UE to make specific measurements and provides the UE with the information facilitating the measurements such as PRS configuration. The request is directed to the UE's serving base station 18 or 20, which transmits the LPP PDU to the UE 34, where the LPP PDUs are typically transparent to the base stations. In turn, the UE 34 performs the requested measurements in a corresponding LPP PDU. That return LPP PDU is forwarded from the base station 18 or 20 back to the MME 32, again transparently to the base stations and MME, and then along to the positioning node 44. The LPP may be transmitted via control plane (as described in the example) or via user plane. In either case, the LPP may also include LPP extensions, e.g., OMA LPP extension (LPPe) to allow, e.g., for operator- or manufacturer-specific assistance data or assistance data that cannot be provided with LPP or to support other position reporting formats or new positioning methods. "LPP" is used herein in a general sense, i.e., with or without extensions.

In more detail, in LTE a single positioning session—using LPP—is used to support a single location request. Multiple LPP sessions can be used between the same endpoints to support multiple different location requests. Within a session, multiple sequential and/or parallel transactions with unique transaction IDs to associate messages with one another (e.g., request and response) are possible. Each such transaction comprises a single operation (capability exchange, assistance data transfer, or location information transfer). With the specified protocol behavior, by initiating different transactions it becomes possible to send different assistance data for the same cell and receive the associated measurement reports.

The teachings herein exploit this capability in a number of advantageous ways. In one embodiment contemplated herein, the "reference signal type" configuration of a cell is fixed for positioning as a function of the number of antenna ports 22 used for transmission in the cell. Such embodiments advantageously use the network's transmission of positioning assistance data to enhance positioning operations.

Take the illustrated case of FIG. 1, for example, in which the network 10 includes at least one cell 14 in which the base station 18 transmits from more than one antenna port 22, and a least one cell 16 in which the base station 20 transmits from a single antenna port 22. Further, assume that there are a least two types of reference signals (RS) that can be transmitted within the network 10—a first type that can be transmitted from more than one antenna port 22 at a time within a cell, without introducing positioning-related measurement ambiguity, and a second type that can be transmitted from only one antenna port 22 at a time within a cell, without introducing positioning-related measurement ambiguity. The CRS is a representative example of the first type of RS, while the PRS is a representative example of the second type of RS. Note that PRS may be transmitted in defined positioning sub-frames.

In a conventional approach, the network (or operator) does not take into account the number of antenna ports 22 being used for transmission in a given cell when deciding whether or not to transmit PRS. Thus, in one aspect of the teachings herein, it is proposed to use different RS types for positioning in different cells, in dependence on the cell port/antenna configuration. As a specific example, only CRS is transmitted in cells 14 that are served by base stations 18 using multiple antenna ports 22. Cells 16 served by base stations 20 transmitting from a single antenna port 22 do transmit PRS. In at least one embodiment, both CRS and PRS are transmitted in cells 16, while only CRS are transmitted in cells 14.

Further, as a specific advantage in at least one such embodiment, PRS assistance data is transmitted in cells 14, even though those cells do not transmit PRS. Correspondingly, one or more of the UEs 34 are configured to exploit the PRS assistance data transmitted in cells 14 as a mechanism for determining whether to use CRS, PRS, or both, for positioning-related measurements. As a further complement, one or more of the UEs 34 are configured to use the PRS assistance data, e.g. expected RSTD or expected RSTD uncertainty, to improve their positioning-related measurements made on CRS.

For example, a network base station 18 uses PRS assistance data within a given cell 14, even though cell 14 and any neighboring cells 14 are not configured for PRS transmissions. The PRS assistance at issue includes, for example, cell ID and the number of antenna ports used in the cell and/or in one or more neighboring cells. Thus, the PRS assistance data transmitted from any given cell in the network 10 would indicate that cells 14 are "multi-port" cells in that their respective base stations 18 transmit using more than one antenna port 22, and that cells 16 are "single-port" cells in that their respective base stations 20 transmit using a single antenna port 22.

A UE 34 receiving this information correspondingly configures its CRS and PRS acquisition/detection processing accordingly, thereby reducing the amount of blind detection needed for measuring CRSs from the neighboring cells. For example, if the assistance data indicates that two (2) or more antenna ports 22 are used for transmitting in a given cell 14, the example UE 34 responds to that indication by performing positioning-related measurements for the given cell 14 using the CRS transmitted in the given cell 14, and does not search for PRS in the given cell 14. This approach deviates from conventional UE behavior, in which, as a general proposition, a UE looks for PRS from any cell for which PRS assistance data is transmitted.

Thus, in at least one embodiment contemplated herein, a wireless communication network is configured to transmit PRS assistance data for all cells 14 and 16 in a given set of neighboring cells, but not to transmit PRSs within those cells 14 that use multiple transmit antenna ports 22. Instead, in such cells 14, only CRSs are transmitted. As noted, PRSs are transmitted in any single-antenna cells 16 within the neighboring set of cells 14 and 16. Advantageously, at least one of the UEs 34 is configured to perform positioning-related measurements using a mix of reference signal types, e.g., the UE 34 performs positioning-related measurements on CRS received from cells 14 and on PRS received from cells 16. Note, too, for any given cells 16, the UE 34 may be configured to use both CRS and PRS, for positioning-related measurements, although PRS generally will be preferred because of its generally subject to lower interference, etc.

As for positioning-related measurements with respect to the multi-port cells 14, assuming that interference is low, a straightforward solution of using CRS for measuring reference signals from multiple antenna ports 22 may be considered. This approach applies, for example, where CRS are transmitted within a cell 14 using multiple antennas 24 in a distributed antenna system 26. However, according to the teachings herein, different transactions need to be initiated for measuring and reporting for different antenna ports 22.

In more detail, the transmission of PRS information (PRS assistance data) as described above is proposed for cells 14 with multiple transmit antenna ports 22, to facilitate CRS signal measurements in positioning subframes. The transmitted PRS information element for a given multi-port cell 14 will indicate the number of antenna ports 22 used in the cell 14. That information is valuable for an appropriately configured receiving UE 34, even though PRS are not transmitted in the cell 14. That is because the UE 34 is configured to use the PRS assistance data to optimize or otherwise configure its CRS acquisition and measurement processing. Furthermore, the PRS assistance data may also contain the expected reference signal time difference (RSTD) and the uncertainty, which can also be utilized for CRS processing.

In an example of this proposed solution, at least one radio node with multiple antennas does not transmit PRSs but rather provides only CRSs for positioning measurements; at the same time, PRS assistance data is transmitted by/for this node. Further, antennas with single antenna ports may continue transmitting PRSs.

An appropriately configured UE 34 will, for example, take its failure to detect a PRS from a given cell as a trigger to use CRS from that cell for positioning-related measurements, and to use the relevant PRS assistance data for enhancing the UE's processing of the CRS.

Thus, a UE 34 determines that a given cell 14 does not transmit PRS and that triggers the UE 34 to perform positioning-related measurements for that given cell 14 using CRS. The UE 34 detects the absence of PRS based on, for example, reading the positioning assistance information included in the positioning assistance data received by the UE 34. That data includes, for example, an indication of the number of antenna ports 22 that are used for transmitting in the cell 14 and the UE 34 is configured to recognize that the use of more than one antenna port 22 means that PRS are not transmitted for the cell 14. Additionally, or alternatively, the UE 34 determines that no PRS are transmitted, based on blind detection in transmission subframes within a positioning occasion. In any case, such detection serves as a trigger for the UE to measure and report on the CRS rather than the PRS, possibly without testing for PRS muting.

In more detail, the UE 34 is configured to detect and distinguish (e.g., in time) among multiple antenna ports 22 in the measured cell 14 and measure/report separately for each antenna port. The radio node, e.g., the base station 18, shall not transmit PRS while multiple antenna ports 22 are active. However, despite not transmitting PRS, the base station 18 nonetheless transmits PRS assistance data, to inform the UE 34 about the number of antenna ports 22 used for transmitting CRS in the cell 14.

Further for this embodiment, the positioning node 44 shall not request or expect the UE 34 to measure on PRS in a cell 14 using a distributed antenna system 26 for transmission, or using another multi-port transmission arrangement. This configuration may impact, for example, the neighbor list formation communicated to the UE 34 in the assistance data. Signaling between the positioning node 44 and the base station 18 is also considered. In general, the positioning node 44 may need to be informed that cells 14 do not transmit PRS, or at least be informed as to which cells are multi-port cells 14 rather than single-port cells 16. Such information enables the positioning node 44 to correctly interpret the set(s) of measurements received from the UE 34, which in such embodiments will generally include CRS-based positioning measurements with respect to one or more cells 14, and PRS-based positioning measurements with respect to one or cells 16. The positioning node 44 accounts for the restricted transmission of PRS when generating the PRS assistance data. PRS muting configuration information for which signaling has been standardized may be utilized for this purpose.

In another embodiment disclosed herein, multi-port cells 14 are controlled or otherwise configured such that the cell's base station 18 transmits PRS from one antenna port 22, and CRS from the other antenna ports 22. In at least one such embodiment, at any time instance, PRSs are transmitted from only one antenna port 22 in a cell 14, while CRSs may be transmitted from any one or more antenna ports 22 in the same cell 14.

For example, in a cell 14 having four (physical) antenna ports 22, PRS are transmitted from a selected one of those ports 22, while CRSs are transmitted from all of them, or at least some of the remaining three ports 22. The physical PRS port selection can be static or dynamic. It is dynamic in at least one embodiment, wherein the selected PRS port changes over time, either responsive to ongoing control, or responsive to predefined patterns, e.g., muting pattern or other transmission pattern. Generally, the association of the physical PRS antenna port and the logical PRS antenna port can be configured/re-configured statically, semi-statically or dynamically.

Thus, as an example, this embodiment comprises transmitting PRSs from one physical antenna port 22 at a time, within a given cell 14 that has two or more physical antenna ports 22. The cell 14 transmits CRSs from the remaining physical antenna ports 22—i.e., at any one time, only one physical antenna port 22 of the cell 14 is designated for the transmission of PRS.

Because the minimum PRS periodicity is much larger than any reasonable delay (e.g., due to the channel or distance) a UE 34 may expect, it is possible to avoid PRS measurement ambiguity due to switching which one of the antenna ports 22 is used for transmitting PRS, while ensuring at most one active PRS antenna port at any time. Also, because CRS are not transmitted in the PRS symbols, the dynamic PRS antenna port switching does not affect CRS transmission in the cell 14 and allows also for dynamic reusing of CRS antenna ports for PRS transmissions at any time and any antenna port.

Here, it will be understood that any given antenna port 22 in a multi-port cell 14 can be referred to as a "CRS port" if the port 22 is used for CRS transmission, and as a "PRS port" if the port 22 is used for PRS transmission. It should also be understood that, because the actual symbol times used for transmitting PRS during the subframes of a positioning occasion are not used for CRS transmission, a given antenna port 22 in the cell 14 can be used for transmitting both PRS and CRS, although PRS is not transmitted from more than one of the ports 22 at a time and the particular port 22 used for PRS can be statically fixed or dynamically changed.

Not detecting PRS transmissions from a given antenna port 22 in the cell 14 will be interpreted by the UE 34 as PRS muting, which means that dynamically changing the physical antenna port 22 from which PRS are transmitted will not upset UE operation. In one embodiment, switching PRS transmissions among multiple antenna ports 22 in a multi-port cell 14 is implemented in the network 10 as PRS muting, where the muting on each such antenna port 22 can be detected blindly by the UE or from transmitted muting signaling describing the muting pattern.

However, although PRS muting is known and muting pattern signaling is also known, it is proposed herein to coordinate muting over multiple antenna ports 22 within one or more multi-port cells 14. In one embodiment, the PRS muting configurations over multiple physical antenna ports 22 used for transmitting within a multi-port cell 14 is centrally coordinated, e.g., by the positioning node 40. Alternatively, the muting patterns are derived taking into account all of the physical antenna ports 22 from which PRS may be transmitted and not just one statically configured PRS port. An example method for dynamic PRS port switching is shown in FIG. 4, wherein one sees an alternating pattern used to select the particular port 22 used for PRS transmission over a succession of positioning occasions.

Figure 4:
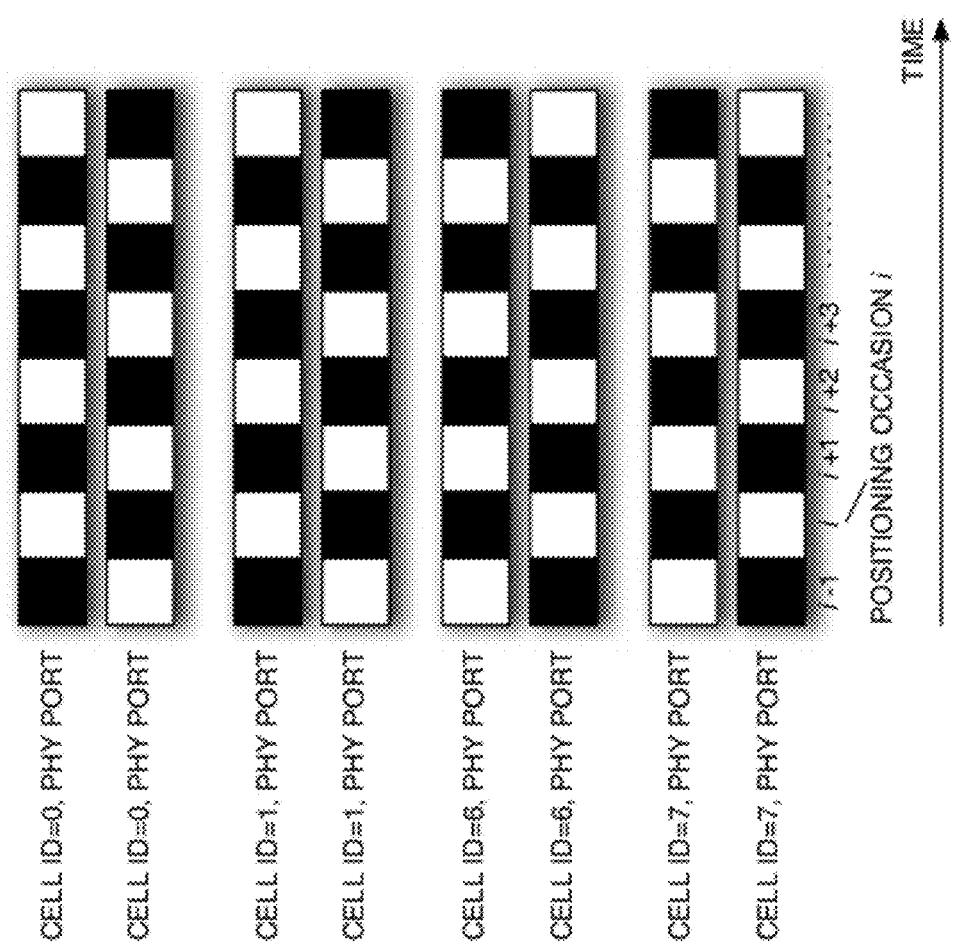
FIG. 4 is a diagram of one embodiment of a method of dynamically switching the antenna port used for reference signal transmission in a number of multi-port cells.

In more detail, FIG. 4 illustrates a method for dynamic port switching for PRS, where a square indicates whether PRS is transmitted or not in the indicated time slot (PRS is transmitted for the black squares but not for the white squares). The illustration is based on the example use of the following physical ("PHY") ports: CELL ID=0, PHY PORT 0, and CELL ID=0, PHY PORT 1. Of course, the illustrated pattern and port usage is a non-limiting example, but the example pattern illustrates that PRS is not transmitted from more than one port 22 at a time within a given cell. A square may correspond to a subframe or a positioning occasion comprising a number of consecutive positioning subframes.

Note also that cells with cell IDs 0 and 1 as well as cells with the cell IDs 6 and 7 transmit PRS in the same positioning occasion. This is because their PRS patterns (mapped to cell IDs) are orthogonal—see 3GPP TS 36.211. However, the cell with cell ID 0 has the same PRS pattern as the cell with cell ID 6. The same applies for the cell with cell ID 1 and the cell with cell ID 7, i.e. their patterns are non-orthogonal and thus it is desired that these cells transmit PRS in different time slots, e.g., different positioning occasions.

Not transmitting PRS in a given positioning occasion can be viewed as PRS muting. The muting patterns are to be signaled from the positioning node 44 to the UEs 34, for example. The muting pattern may be described by a bitstring where a bit set to 1 indicates that PRS is muted in the corresponding positioning occasion. Thus, the PRS muting patterns with the same reference point in time can, for example, be as follows:
Cell ID=0, PHY port=0:01010101, PHY port=1:10101010;
Cell ID=1, PHY port=0: 01010101, PHY port=1:10101010;
Cell ID=6, PHY port=0:10101010, PHY port=1: 01010101;
Cell ID=7, PHY port=0:10101010, PHY port=1:01010101.

The above bitstrings thus embody a method for coordinated PRS muting for a number of multi-port cells 14. Alternatively, for the same example, one may associate a bitstring with the physical port 0, assuming reference point in time x, while for the physical port 1 in the same cell the base pattern is the same but the reference point may be shifted by 1 positioning occasion, being x+1. Thus, the PRS muting configuration can be a function of the physical antenna port 22, the number of which is not necessarily limited to two ports 22.

In at least one embodiment, the muting configuration is signaled per antenna port 22, to inform UEs 34 as to when the PRS is transmitted. An example configuration is based on the use of one muting pattern, but where port-dependent time shifts are used. Again, see FIG. 4. Alternatively, different muting patterns are explicitly signaled with respect to each port 22. In the two-port example illustrated in FIG. 4, it may also be sufficient to signal the muting pattern for one antenna port and assume by default the orthogonal pattern for the other one, i.e., the available port-independent signaling may be adopted together with a pre-defined rule or UE behavior.

In another embodiment, positions of the physical antenna ports 22 are included in the assistance data signaled by the positioning node 44 to the UEs 34, which is necessary for UE-based positioning, for example. Antenna port locations are also signaled to the positioning node 44 from the base stations 18 (e.g., over LPPa protocol), or from the O&M node 36. As another alternative, the antenna positions are signaled together with the PRS muting patterns.

The UEs 34 may or may not be notified by the network 10 about the physical PRS antenna port 22 (e.g., in terms of the port identification, location, etc). When not notified, a UE 34 may blindly search for PRS using the positioning assistance information, if available. The positioning occasions where PRS are not transmitted from a given antenna port 22 shall not be integrated by the UE 34 with previous positioning-related measurements made by the UE 34 for the corresponding measured antenna port 22. That is, in at least one embodiment, the UE 34 assumes that PRS is transmitted from a different antenna port 22 in a given multi-port cell 14, for each positioning occasion. In this case, the UE 34 is configured to report positioning-related measurements for every positioning occasion separately.

In the case of PRS antenna port switching, the UE 34 may distinguish PRS transmissions from different antenna ports 22 of the same cell 14 by the associated different assistance data, e.g. different positioning configurations with different positioning subframe offsets. Further, in the case of UE-assisted positioning where a static PRS antenna port configuration is used, the UEs 34 do not need to know the location of the antenna corresponding to the antenna port 22 used for PRS transmission, because this knowledge is available in the network 10 where position calculation takes place. However, if the positioning is UE-based rather than UE-assisted, the UEs 34 do need to know the antenna location associated with the transmit antenna port 22 used for PRS transmission.

In any case, detecting the antenna ports 22 used for CRS transmission may or may not be complemented by use of the assistance data from the network 10. Using different dynamically expanded neighbor cell lists for measuring on different signal types is another possibility for supporting the measurement of PRS and CRS on different antenna ports 22 within the same cell 14, which is another advantageous aspect of the teachings disclosed herein.

As another advantage of one or more embodiments, the transmission of CRS in a multi-port cell 14 is restricted to a single one of the antenna ports 22 during positioning occasions. That is, for a given multi-port cell 14, the following rules apply: (a) PRS is transmitted from only one antenna port 22 at a time; (b) CRS may be transmitted from any or all of the antenna ports 22 at a time, including the antenna port 22 used for PRS transmission; (c) the particular one of the antenna ports 22 used for PRS transmission can be changed over time (e.g., over a succession of positioning occasions); and (d) while CRS may be transmitted from any or all of the antenna ports 22 during times other than positioning occasions, CRS is restricted to transmission from only one of the antenna ports 22 during the positioning subframes in each positioning occasion.

Figure 5:
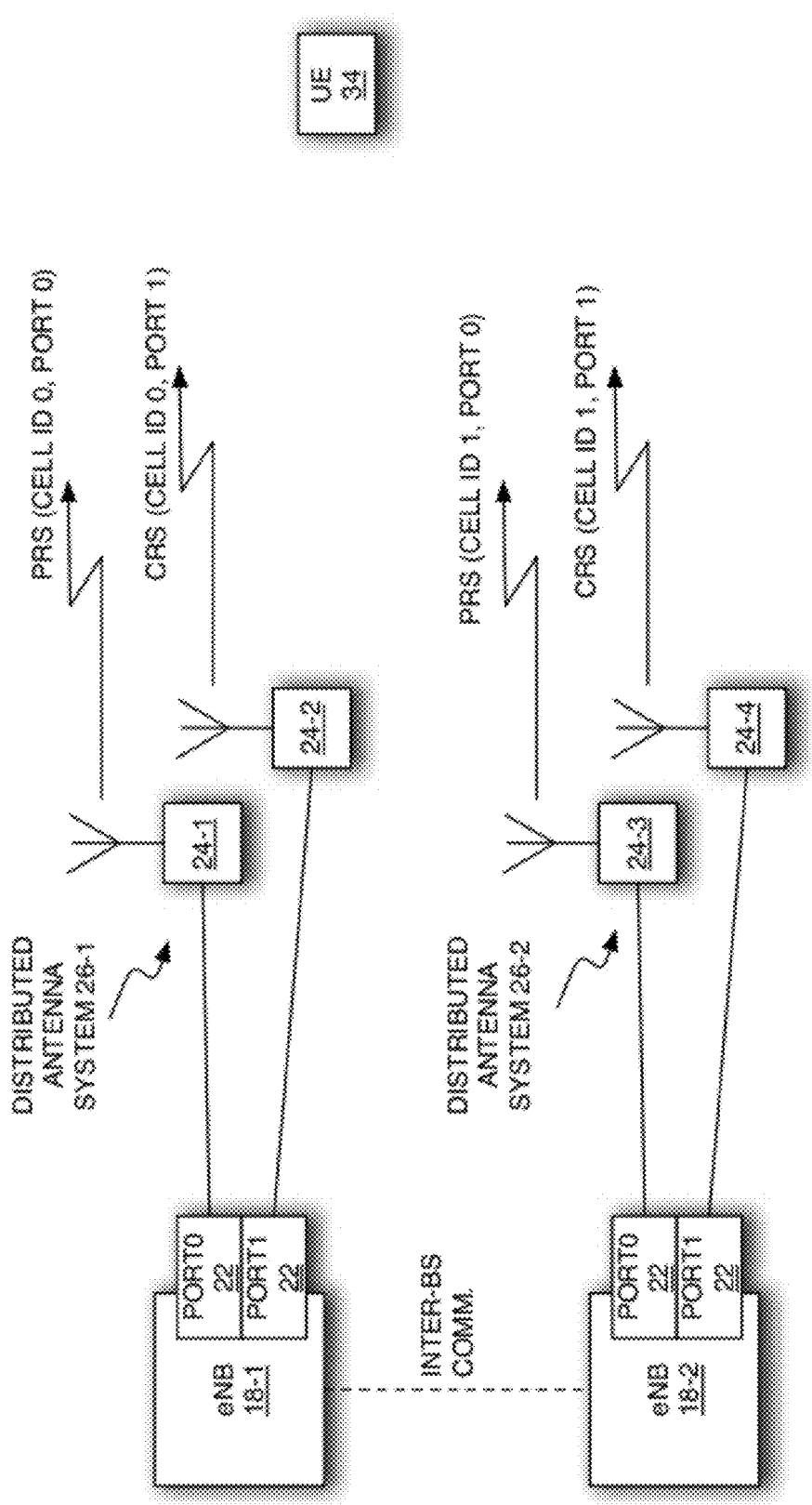
FIG. 5 is a block diagram of one embodiment of transmitting non-orthogonal reference signals using beam forming/steering, in conjunction with transmitting orthogonal reference signals from antennas having overlapping coverage areas.

With two spatially separated antenna ports, the above solution allows for effective twelve-reuse: one port 22 can be used only for six-reuse PRS transmissions and another port 22 can be utilized only for six-reuse CRS transmissions (which are designed not to overlap with the PRS patterns). This special case is illustrated in FIG. 5, where two base stations 18-1 and 18-2 transmit in multi-port fashion using distributed antenna systems 26-1 and 26-2, respectively. One sees that each base station 18 uses only one antenna port 22 for PRS transmission and only one antenna port 22 for CRS transmission. These port restrictions are applied at least during positioning occasions. Note that with the relevant current standards, CRS is always transmitted from at least "Port 0," so port numbering in FIG. 5 and elsewhere herein is not limiting unless so specified, and instead presented for purposes of illustration and to aid clarity in the discussion.

In such an embodiment, one or more of the UEs 34 are configured to detect and distinguish (e.g., by time separation) multiple antenna ports 22 in the measured cell 14 and measure/report separately on each antenna port 22. In the case of dynamic port switching, the UE 34 shall also be able to detect PRS on different antenna ports 22. No explicit knowledge of the physical port is required, but the UE 34 does need to know at least when to start/stop measuring and report the measurements, to avoid mistakenly integrating the positioning-related measurements corresponding to different antenna ports 22. Using patterns with scheduling PRS by antenna ports, which are either signaled or predefined (i.e. a priori known) to the UE, is a possible approach where signaling of a pattern may be implemented as PRS multi-antenna muting signaling (e.g., over LPP between the positioning node 44 and the UE 34 or other protocol between a base station 18 and a UE 34).

Further, in at least one such embodiment, the base stations 18 are configured to select the PRS port statically, semi-statically or dynamically (one port 22 at any time out of multiple ports 22 in a cell 14). In at least one embodiment, the base stations 18 are configured to select the PRS port using patterns, along with scheduling PRS by antenna ports 22, which such patterns are either predefined (i.e. a priori known to the base stations 18). Coordinated multi-antenna muting for PRS transmission is also contemplated herein. Such coordination may be within each cell 14, over the antenna ports 22 used in that cell 14. Coordination among or across base stations 18 for neighboring cells 14 may also be used, such as where the base stations 18 is engaged in distributed negotiation of the pattern(s) (e.g., over an inter-base-station interface such as the X2 interface).

Note, too, that the coordination may involve the positioning node 44 (e.g., via LPP Annex (LPPa) signaling). Thus, in at least one embodiment contemplated herein, the positioning node 44 is configured to implement coordinated PRS antenna port selection/switching across multiple multi-port cells 14, with or without signaling the configuration to the UEs 34 and/or the base stations 18.

In yet another aspect of this disclosure, one or more embodiments of the network 10 are distinguished in that PRS is transmitted from one antenna port 22 per carrier (e.g., per downlink carrier), with CRS transmitted from the other antenna ports 22 for that carrier. This extension to multi-carrier networks may be understood as a case where the maximum number of simultaneously used PRS ports in a given multi-port cell 14 shall not exceed the number of carriers deployed in that cell 14—i.e., for each carrier, only one antenna port 22 is used at a time, to transmit PRS for that carrier frequency. For each such carrier, the remaining antenna ports 22 in the cell 14 can be used for CRS only.

Figure 6:
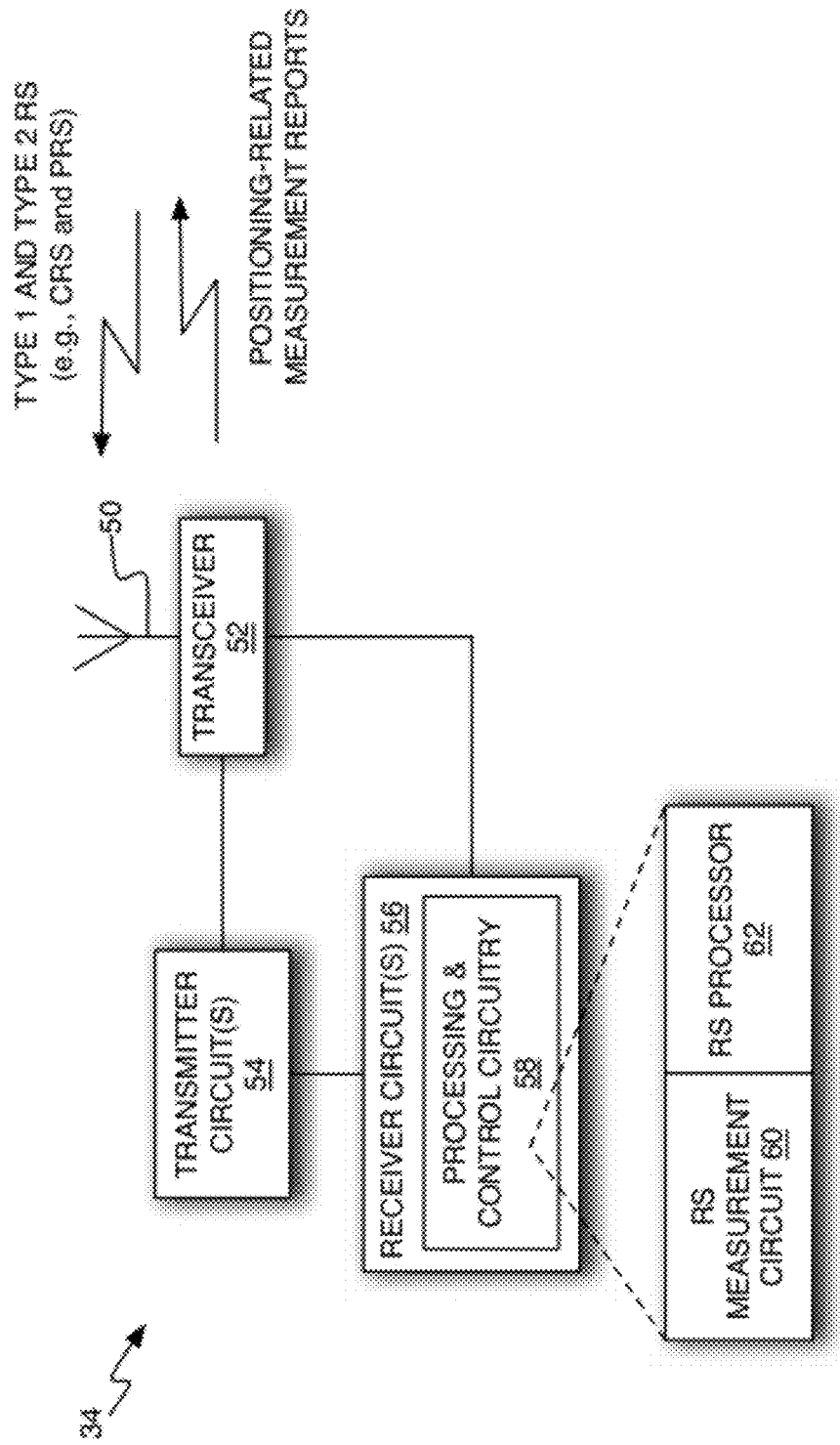
FIG. 6 is a block diagram of a user equipment (UE) configured according to one or more embodiments disclosed herein.
Figure 7:
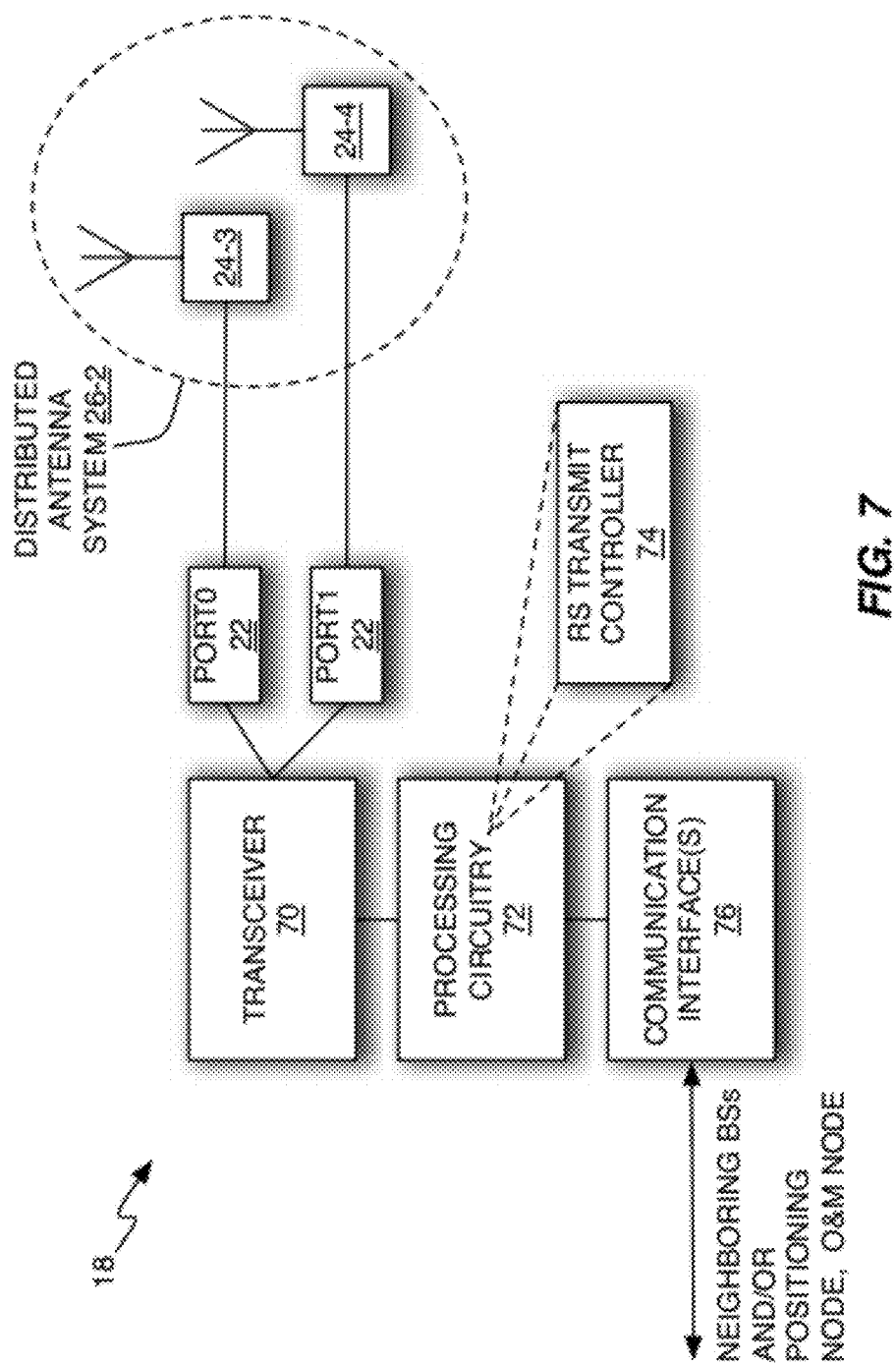
FIG. 7 is a block diagram of a multi-port base station configured according to one or more embodiments disclosed herein.

Supporting the functionality in one or more such embodiments on both the network side and on the terminal or UE side, FIGS. 6 and 7 depict example embodiments of a base station 18 and a UE 34. Taking the example UE 34 of FIG. 6 first, those of ordinary skill in the art will appreciate that the illustrated UE 34 comprises, for example, a cellular telephone or smartphone, a network communications adaptor, a laptop, palmtop, PDA, or other computer device with wireless communication capability. Further, it will be readily appreciated that in one or more embodiments, the UE 34 includes computer circuitry, such as one or more microprocessors and/or DSPs. Indeed, in a least one embodiment, the UE 34 includes a microprocessor or other digital processor that is configured to carry out the UE-side operations disclosed herein, based on its execution of stored computer program instructions, e.g., a computer program stored in memory or another computer-readable medium within the UE 34.

With these implementation examples in mind, one sees that the example UE 34 includes one or more antennas 50 used for receiving signals from the network 10. The received signals include first and second types of RS, such as CRS and PRS. The antenna(s) 50 are further used for sending signals to the network 10, including positioning-related measurement reports.

As an example, the UE 34 sends RSTD values derived from positioning-related measurements made for a mix of CRS and PRS, where the UE 34 differentiates or otherwise separates the measurements it makes for CRS and PRS. That is, the UE 34 may determine RSTD values, or other OTDOA-based measurements using a mix of CRS and PRS. Advantageously, the UE 34 performs measurements on CRS on a per-port basis for each multi-port cell 14 from which it receives CRS, and also differentiates PRS measurements on per-positioning occasion basis, i.e., it does not assume that that the same antenna port 22 is used to transmit PRS on successive positioning occasions. Advantageously, the UE 34 may reconcile or otherwise reference CRS and PRS to the same reference signal timing, to derive RSTD values using PRS from one port 22 or cells 14 and/or 16, and CRS from one or more other ports 22 or cells 14 and/or 16.

In any case, the antenna(s) 50 couple to a transceiver 52, which is a cellular communication transceiver in one more embodiments, such as an OFDM transmitter and an OFDM receiver for use in an LTE-based embodiment of the network 10. In turn, transmitter circuits 54 provide data/signals for transmission to the transceiver 52, and receiver circuits 56 derive received data and control signaling from the signals incoming to the UE 34 from the network 10. In particular, the receiver circuits 56 include processing and control circuitry 58, which may be a baseband digital processor and which includes a reference signal (RS) measurement circuit 60 and a RS processor 62.

The reference signal measurement circuit 60 provides for signal measurement on the CRS and PRS, while the reference signal processor 62 controls its operations, and reconciles the different measurements made at different times (occasions) and for different antenna ports 22. The reference signal processor 62 is further configured to manage the positioning-related measurement reporting functions of the UE 34. Of course, the UE 34 should be understood to be a non-limiting example of a wireless communication apparatus configured according to the teachings disclosed herein.

FIG. 7 depicts an example embodiment of a base station 18—i.e., a multi-port base station which may, for example, use multiple antenna ports 22 for distributed measurement from spaced-apart antennas 24 in a distributed antenna system 26. The base station 18 may be implemented at least in part as a computer system or other digital processing system, and in one or more embodiments is configured at least in part based on one or more microprocessors or other digital processors executing computer program instructions stored in a computer-readable medium included within the base station 18.

Of course, the base station 18 includes wireless communication circuitry for communicating with the UEs 34. For example, the illustration depicts a transceiver 70 and it will be understood that the transceiver 70 may, in actuality be a collection of transmitters and receivers for transmitting and sending cellular signal—e.g., OFMD-based transmitters and receivers for communicating according to the OFDM-based LTE air interface.

The base station 18 correspondingly includes processing circuitry 72, which may comprise digital processing circuits for transmit and receive processing, communications management and base station control. These circuits include a reference signal transmit controller 74, which is configured to control reference signal transmissions from the base station 18. The reference signal controller 74 in one or more embodiments operates autonomously, where it determines reference signal timing and any patterns (e.g., for muting and/or dynamic port switching). In other embodiments, the reference signal controller cooperates with other entities, such as neighboring base stations 18, the positioning node 44, and/or the operations and maintenance node 36.

To this end, the base station 18 includes one or more communication interfaces 76, for communicating with other base stations 18 or 20, and/or with entities in the core network 30. It will also be appreciated that the same or substantially the same implementation is used for base stations 20, although the reference signal controller 70 may operate differently, depending upon the embodiment. For example, if base stations 20 are single-port base stations, the reference signal controller 74 in such cases does not dynamically switch between antenna ports 22 for transmitting PRS, although it may still apply dynamic muting patterns. Further, in the single-port case, the reference signal controller 74 is configured to manage both PRS and CRS transmissions from a single antenna port 22.

Figure 8:
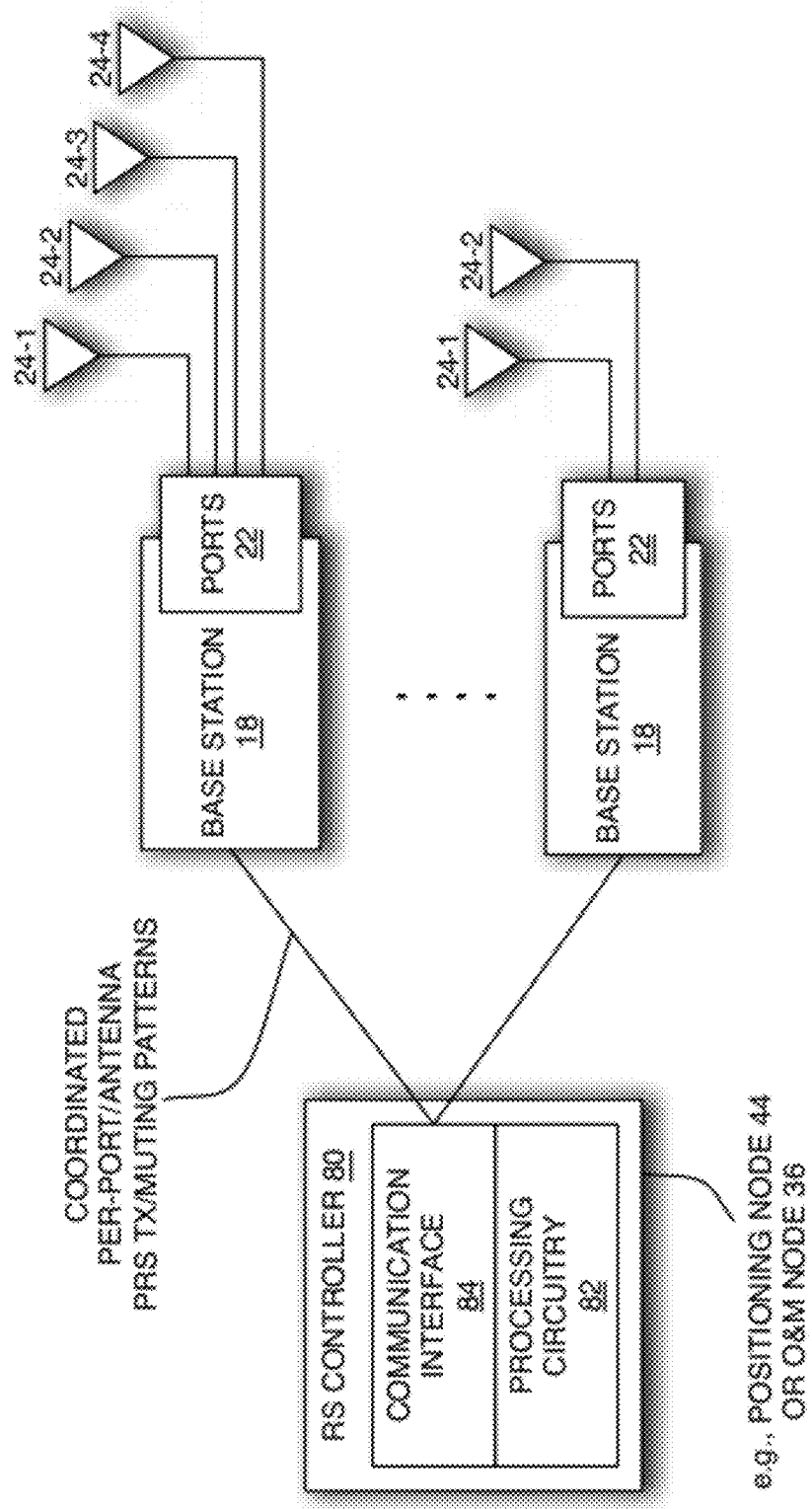
FIG. 8 is a block diagram of one embodiment of a centralized reference signal controller communicatively linked to a number of base stations.

As for the coordination of one or more of muting patterns, port switching, etc., FIG. 8 illustrates an embodiment contemplated herein that relies on central coordination, e.g., by a "centralized" reference signal controller 80. Here, the reference signal controller 80 is considered centralized in that it coordinates reference signal transmissions across a number of cells 14 and/or 16. Any number of nodes in the core network 30 may be configured to operate as the reference signal controller 80—such as the positioning node 44 or the operations and maintenance node 36. In at least one embodiment, the reference signal controller 80 defines or otherwise controls which port 22 is selected for transmitting PRS, for each of a number of multi-port base stations 18 transmitting in respective cells 14.

For example, the reference signal controller 80 defines or otherwise controls a dynamic pattern that changes when and how PRS muting is applied in each such cell 14, and controls the pattern or timing used to dynamically switch from port-to-port in such cells 14, for PRS transmission. To this end, it will be appreciated that the reference signal controller 80 includes processing circuitry 82 (e.g., computer-based digital processing circuitry) for determining the patterns, timing, etc., and includes one or more communication interfaces 84, for sending control signaling to the base stations 18 and/or for sending related control signaling and assistance data to the UEs 34.

FIG. 9 illustrates a method 900 of centralized control, as is implemented by the positioning server 44 or operations and maintenance node 36, acting as the reference signal controller 80. According to the method 900, centralized control in the broad sense comprises coordinating the use of antenna ports 22 for PRS transmission (TX) from one or more ports 22 at a time, in each of one or more multi-port cells 14 (Block 902). The method 900 further includes sending corresponding signaling to the involved base stations 18 and/or affected UEs 34 (Block 904). That is, the method 900 includes sending control signaling that imposes the defined muting and/or static or dynamic port switching patterns and/or includes sending signaling to the UEs 34 that identifies the patterns, to aide processing at the UEs 34 and to minimize the amount of blind detection/searching performed at the UEs 34.

Whether controlled by a centralized controller, determined cooperatively among base stations 18, or determined autonomously at each base station 18, FIG. 10 illustrates method 1000 of reference signal transmission and control as implemented at a multi-port base station 18. The method includes transmitting a first type of reference signal from any one or more of the multiple antenna ports 22 used by the base station 18 for transmitting in its respective cell 14 (Block 1002). As an example, the base station 18 transmits CRS simultaneously from each of two or more antenna ports 22.

However, the method further includes the base station restricting transmission of a second type of reference signal—e.g., PRS—such that this second type of reference signal is transmitted in the cell 14 from only one antenna port 22 at a time. In particular, the method includes the base station 18 using a defined port configuration that controls which port 22 is used for such transmission (Block 1004). That configuration is static in one or more embodiments; although which port 22 is used can be changed by modifying the static configuration. In another embodiment, the configuration defines a dynamic pattern or timing for switching which port 22 in the cell 14 is used for transmitting the second type of reference signal. As an example, the port configuration defines for the base station 18 how to switch from one port 22 to the next, from among the available antenna ports 22, over a succession of positioning occasions.

Figure 11:
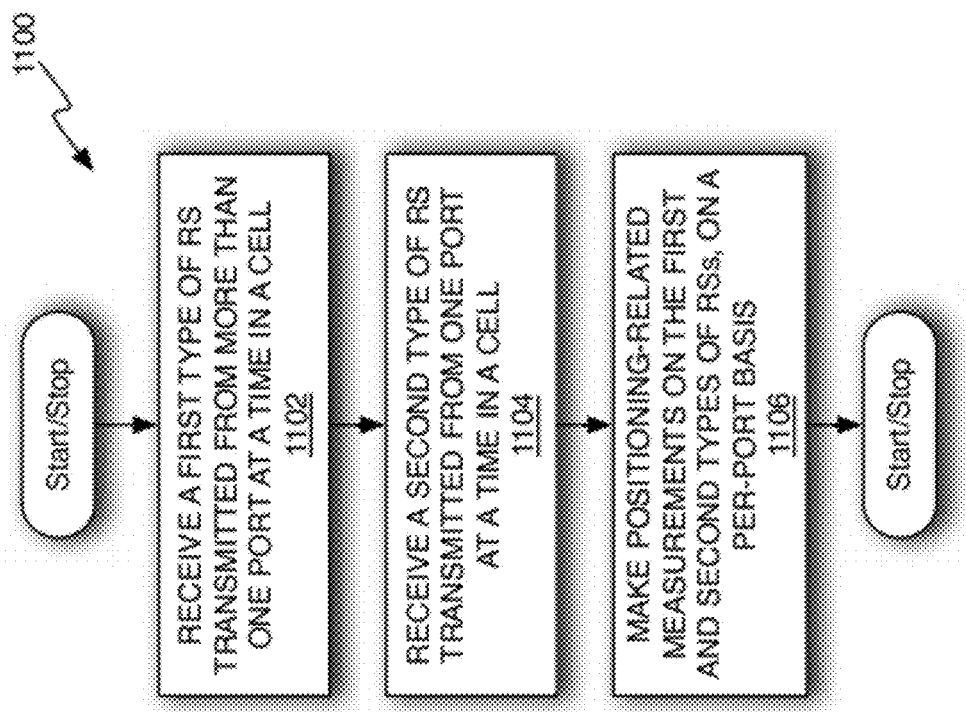

Turning to the UE 34, FIG. 11 illustrates a method 1100 relating to the embodiment where the UE 34 receives reference signals of a first type transmitted from more than one antenna port 22 at a time, for a given multi-port cell 14 (Block 1102). Further, the UE 34 receives a second type of reference signal from only one port 22 at a time for the cell 14 (Block 1104). The UE 34 is configured, as detailed in several instances earlier herein, to make positioning-related measurements on the first and second types of reference signals, on a per-port basis. Advantageously, for example, the UE 34 makes RSTD or other relative timing difference measurements based on distinguishing CRS from one antenna port 22 versus another antenna port 22 in the same cell 14. Further, the UE 34 may make relative timing measurements using CRS from one port 22 and PRS from another port 22. Additionally, or alternatively, such as where the network 10 performs the timing difference calculations, the UE 34 is configured to provide separate measurements and reporting for each antenna port 22 in a given cell 14 (Block 1106). In one embodiment, the UE 34 may perform position calculations itself while using the described measurements.

Of course, in one of the embodiments contemplated herein, multi-port cells 14 transmit only a first type of reference signal (e.g., CRS) and do not transmit a second type of reference signal (e.g., they do not transmit PRS). Single-port cells 16 transmit both types of reference signals. In such cases, then, the UE 34 must make positioning-related measurements using the first type of reference signal for multi-port cells 14, and using the first or second type of reference signal for single-port cells 16. Preferably, in the case where the second type of reference signal experiences lower interference or otherwise of higher quality for positioning-related measurements—e.g., PRS versus CRS—the UE 34 uses the second type of reference signal for positioning-related measurements whenever it is available.

Figure 12:
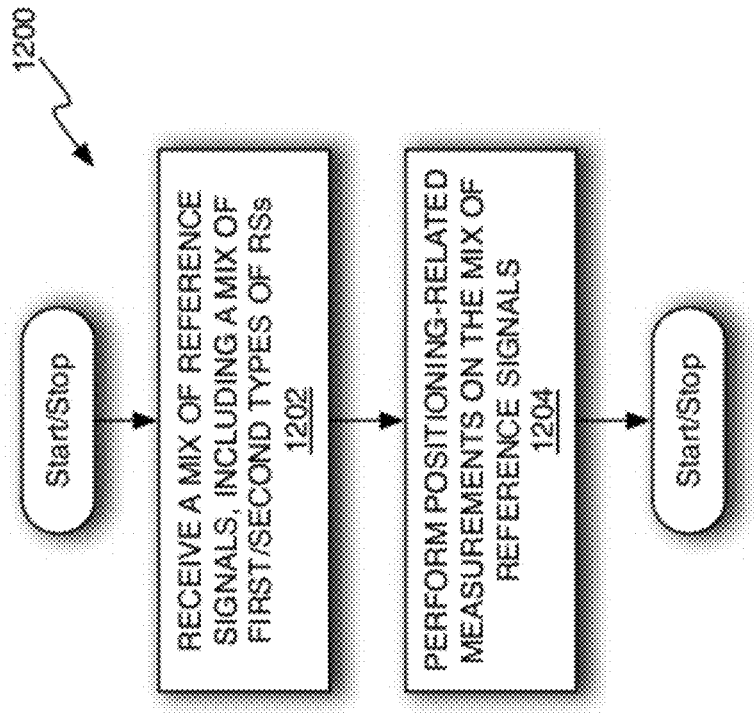
FIGS. 11 and 12 are block diagrams of example embodiments of methods at a UE of using first and second types of reference signals for positioning-related measurements, where FIG. 11 focuses on processing a mix of signal types as received from multiple antenna ports of a given multi-port cell and FIG. 12 focuses on processing a mix of signal types as received from two or more cells.

In any case, however, FIG. 12 illustrates a method 1200 that provides for operation with a mix of neighboring cells 14 and 16, for which the UE 34 receives a mix of reference signals—e.g., the first type of reference signals from the cells 14 and the first and second types from cells 16. The method thus includes receiving a mix of reference signals of the first and second types (Block 1202), and performing positioning-related measurements on the mix of reference signal types from one or more cells 14 and one or more cells 16 (Block 1204).

Another embodiment herein uses beamforming techniques to enhance the space diversity of PRS. At least one such embodiment uses simultaneous PRS transmissions from more than one physical antenna (connected to the same or different antenna ports 22) while ensuring space orthogonality of received PRS signals transmitted from different antennas by using beam forming.

The optimal set of antennas (beams) to use for simultaneously transmitting PRS may be decided by solving an optimization problem, either heuristically or using a suitable optimization technique. With this solution, the period during which any given transmit antenna is passive ideally reduces to zero. With reference to multiple antennas 24 transmitting within a given cell 14—see FIGS. 1 and 2, for example—given antennas 24 within the same cell 14 may transmit the same PRS in different directions. This means, provided adequate separation in beam directions, that non-orthogonal PRS can be simultaneously transmitted from different antennas 24 in the same cell 14.

The transmission configuration of FIG. 5 provides a working example of such directional PRS transmission. Assume that antennas 24-1 and 24-3 have overlapping coverage areas for non-directional transmission, and assume that the UE 34 is within the coverage overlap. In this case, if antenna 24-1 and antenna 24-3 are used for simultaneous, non-directional transmission of PRS, the PRS from antenna 24-1 must be orthogonal to the PRS from antenna 24-3, for the UE 34 to distinguish the PRS from antenna 24-1 from the PRS from antenna 24-3. In the diagram, the PRS from antenna 24-1 is transmitted from PORT 0 of the distributed antenna system 26-1, which has CELL ID 0, while the PRS from antenna 24-3 is transmitted from PORT 0 of the distributed antenna system 26-2, which has CELL ID 1. Thus, the UE 34 can distinguish between them.

The distributed antenna systems 26 can also be used to transmit non-orthogonal PRS at the same time from different ones of the antennas 24. However, in such cases, beam-steering is used to achieve directional transmissions of one or more of the non-orthogonal PRS, so that non-orthogonal PRS from different antennas 24 are simultaneously transmitted into the same or overlapping coverage areas. Doing so prevents ambiguity in positioning measurements made with respect to two different antennas 24, even if they are transmitting the same PRS simultaneously. The transmission links may also be changed dynamically, e.g., by changing beam configuration, while still ensuring the spatial orthogonality of the signals used for positioning measurements.

Other aspects considered herein include optimization-based approaches for multi-antenna positioning configuration planning Optimizing multi-antenna positioning configuration is a complex optimization task. Further, the set of feasible signal types to use for multi-antenna transmissions, for purposes of positioning, must be considered.

The set, for example, may consist of PRS and CRS in LTE, and may include other signals, such as "synchronization" channel signals. The maximum set of feasible reference signal patterns for a given reference signal type per antenna, also may be considered. The set may consist of one pattern, for example, in case of one-to-one mapping of the reference signal pattern to cell ID (as is done currently for PRS in LTE) and the cell IDs have been already planned. Alternatively, the set may contain more than one pattern when, for example, the reference signal pattern depends on the logical antenna port and the logical antenna ports may be re-planned.

Further, the set may be rather large when, for example, the cell IDs are not decided yet and positioning planning is considered as a part of the cell ID planning.

A further consideration is the maximum number of logical antenna ports per cell from which signals used for positioning measurements can be transmitted. This number determines the number of simultaneously active antenna ports 22 (see FIG. 2, for example) when the orthogonality at the receiver (e.g., UE 34) cannot be guaranteed.

Non-orthogonality introduces positioning-related measurement ambiguity that cannot be resolved. That is, if the same signal is transmitted from two antennas 24 with overlapping coverage, a receiver in the overlapping coverage area generally cannot wholly separate or otherwise discriminate between the signals as received from one antenna versus the other.

Further, the interference on the signals used for positioning measurements needs to be minimized. This need decides the set of simultaneously transmitting antennas over a wireless communication network, and further influences the signal types used and the signal patterns assigned to each antenna. For methods relying on measurements from multiple cells (e.g., OTDOA), the signal transmissions (alternatively, measurements by controlling the assistance data) need to be scheduled, to ensure good space geometry for nodes being positioned. Here, the "nodes" being positioned may be any given UE 34 or UEs 34 operating within the network 10.

As is taught in one or more embodiments herein, positioning-related signal transmissions from multiple distributed antenna ports 22 within a given cell 14 (or across multiple such cells 14) may be scheduled in different time slots in order to improve the geometry for some UEs 34. This solution, however, generally requires shorter transmission times from each antenna 24. Alternatively, scheduling can be combined with beam forming to allow simultaneous transmissions from at least some of the antennas 24 in the same cell 14.

In one approach to optimizing a network 10 for positioning of UEs 34 or other mobile nodes operating in the network 10, it is proposed to integrate positioning optimization into the general network planning task, e.g., as part of cell ID planning. In another approach to optimization, positioning-related planning is done with respect to a given, established cell configuration (e.g., fixed cell IDs). Yet another optimization approach detailed herein involves "operational" positioning optimization, including dynamic controls, such as scheduling in time.

When integrating positioning optimization into the general network planning task, a number of factors are considered. For the LTE example case, for given base station locations and antenna configuration plans, one of the aspects to be considered in cell ID planning is ensuring proper performance of the synchronization and CRS signals. For both of these physical layer signal types, the signal sequence is determined as a function of the cell ID.

Consider synchronization signals in LTE, for example. LTE synchronization signals use the same transmission pattern in all cells. However, the signals have relatively bad correlation properties because of their use of short sequences. Ensuring good correlation performance therefore is recognized herein as a driving factor for ensuring good synchronization signal performance.

In particular, to ensure good cell detection performance, cell IDs, planning must avoid using the same Primary Synchronization Signal (PSS) and either of the two Secondary Synchronization Signal (SSS) short codes in neighboring cells. Note, here, that there are three unique sequences available for PSS and 168 available for SSS.

CRS have better correlation properties, but their transmission patterns depend on the cell ID, so for CRS minimizing the interference in neighbor cells is also important. PRS have correlation properties similar to those for CRS and have transmission patterns one-to-one mapped to cell IDs, but the patterns are designed for a higher frequency reuse factor. The major difference from CRS is that PRS patterns are designed for a single logical antenna port, although various aspects of the teachings disclosed herein overcome that limitation.

When optimizing synchronization signal performance and CRS performance, the two objectives (improved correlation and interference minimization) are typically combined into a single objective function that represents the total (over the entire network) "cost" or penalty associated with the selected cell ID plan. This penalty is to be minimized in the optimization process. Accounting for the impact of a cell ID plan in the positioning performance problem means adding the corresponding weighted penalty to the objective function, where the weight describes the importance of the positioning "contribution" to the total objective function. The penalty reflects the average expected positioning performance over the network for the corresponding cell ID plan.

Therefore, to estimate the penalty it is important to know which multi-antenna positioning configuration approach is likely to be implemented in the network. When the cell ID planning problem is solved iteratively, the penalty associated with the positioning performance may be found by solving a positioning optimization problem for the current cell ID plan.

When positioning considerations are included in the cell configuration planning problem, one may begin under the assumption of a fixed cell ID plan for all antenna locations and a set of constraints that ensure that one beam configuration is used at a time for each given antenna 24 within a cell 14 that transmits from multiple antennas 24. The constraints allow for parallel transmissions from multiple antennas 24 of the same cell 14, at least for the case when the transmissions are orthogonal or nearly orthogonal.

The optimization is performed over a set of antennas 24. Assume that n antennas are available, and the antennas can be indexed with unique numbers from 1 to n. Further, assume that N unique reference signals (RS) are available for positioning (e.g., CRS or PRS). For the purpose of selecting which antennas 24 will transmit what RS, the following optimization is suggested herein:

$$\min \sum_{j=1}^{N} a_j^T C_j a_j$$

$$\text{s.t. } A1_N \leq 1_n$$
$$a_j^T d_j = 0, j = 1, \ldots, N$$
$$\sum \sum (\bar{J}_k A \tilde{J}) \geq 1, k = 1, \ldots, K$$
$$A = [a_1 \ \ldots \ a_N]$$
$$A^{(i,j)} \in \{0, 1\}$$

where the minimization is performed over the binary elements (see the last constraint) of the matrix A (consisting of binary vectors $a_j$, j=1, ..., N, which is given by the third constraint) of dimensions n by N. $1_k$ denotes the length k vector of 1.

The element (i,j) in the matrix A indicates whether the RS j is active for antenna i; if that element is 1 then RS j is active for antenna i, otherwise it is not. The first constraint in the optimization problem guarantees that at most one RS is used by one antenna for the purpose of positioning (the available RSs should be spread over the antennas). The element (i,j) in the matrices $C_k$ (which are n by n) describes the cost of having RS k active for antennas i and j simultaneously. Typically, the more the antennas i and j have mutually overlapping areas (this can be derived from coverage maps) the larger this element will be. If there is no shared coverage the element will typically be zero.

The diagonal elements in the matrices $C_k$, k=1, ..., N will typically be ≤0 and describe the reward for having the RS k active on the corresponding antenna. This reward avoids the trivial A=0 solution. Probably, for simplicity one will select $C_i = C_j$ meaning that the costs and rewards are identical for the different RS, or one may also consider different costs/rewards for PRS and CRS respectively. The vector $d_j$ in the second constraint contains 1's on elements corresponding to disallowed RS for the antenna, e.g., due to cell ID, and 0's on elements corresponding to allowed RS, so this constraint guarantees that the selected RS are compatible with the cell IDs.

Finally, there is a sum constraint (the double-sum operation here denotes the sum of all elements in the matrix) on the matrix $\bar{J}_k A \tilde{J}$, where $\bar{J}_k$ is the matrix picking out the rows of a matrix on its right-hand side corresponding to all antennas with the unique cell ID corresponding to the index k (each cell ID is here indexed and there are K cell IDs in total), and $\tilde{J}$ is the matrix picking out the columns of the matrix on its left hand side corresponding to PRS. This sum constraint guarantees that only one PRS is used per cell ID and the constraint has to be fulfilled for each cell ID in the set of antennas.

In a more dynamic approach to positioning optimization, it is contemplated herein to implement a network 10 that includes operational positioning optimization, including scheduling in time. The previously described optimization model can be extended to account for the time component needed for dynamic optimization. A proposed method for accounting for the time component is to penalize the case of having the same antennas broadcasting RS over time. Adding this penalty means that the optimization will gain by changing antennas for different time instants. The result is that the optimization solution is moved towards having higher diversity for the positioning signaling. One may assume herein that the positioning signaling at issue is periodic with a periodicity of T.

As such, the following matrix may be used in the optimization processing:

$$B = \begin{bmatrix} A_1 \\ A_2 \\ \vdots \\ A_T \end{bmatrix}$$

where $A_t$ is the same as the matrix A given above, except for the introduction of the time index t. To penalize against having the same antenna active over time, the following example term can be added to the objective function:

$$\max(b) = \max\left( p \begin{bmatrix} 1 & 0 & \ldots & 0 & 1 & 0 & \ldots & 0 & 1 \\ 0 & 1 & 0 & \ldots & 0 & 1 & 0 & \ldots & 0 \\ \vdots & \ddots & \ddots & \ddots & & \ddots & & & \ddots \\ 0 & \ldots & 0 & 1 & 0 & \ldots & 0 & 1 & 0 & \ldots \end{bmatrix} B 1_N \right)$$

where p is the non-negative penalization factor (a scalar) such that p is added to the objective function for each time in which the same antenna transmits. The matrix to the left hand side of B has n rows (one for each antenna) and the n-th row has its first 1 on its n-th element, then has n 0s and repeats itself. The optimization function therefore becomes $$\min \sum_{j=1}^{N} \sum_{t=1}^{T} a_{j,t}^T C_j a_{j,t} + \max(b)$$

s.t. $A_t 1_N \leq 1_n, t = 1, \ldots, T$ $a_{j,t}^T d_j = 0, j = 1, \ldots, N, t = 1, \ldots, T$ $\text{sum}(\bar{J}_k A_t \bar{J}) \geq 1, k = 1, \ldots, K, t = 1, \ldots, T$ $A_t = [a_{1,t} \ \ldots \ a_{N,t}]$ $A_t^{(i,j)} \in \{0, 1\}$ with a straightforward update of the notation as compared to the earlier optimization equation example to include the time index t.

Note that functions other than the maximization can be imposed on the vector b. In this respect, the goal recognized herein is that large variations of b are penalized. Additionally, the penalization parameter p should be set large enough to give a noticeable penalty to having the same antenna active for multiple time indices, but low enough such that antennas do not stop transmitting the reference signal at issue at the designated transmission occasions—e.g., the optimization solution should avoid the scenario in which no PRS are transmitted in given positioning subframes.

The optimization solutions described above are binary optimization problems, which are typically NP-hard (non-deterministic polynomial-time hard). A suboptimal but computationally feasible approach to the above problems is to consider greedy solutions. As an example, one may start with no antennas active for reference signal transmission (A=0), and then stepwise add RS to new antennas such that the optimization criterion is always decreased by the largest possible amount. Optimization according to this method terminates when no new RS can be added without increasing the optimization function value.

Figure 13:
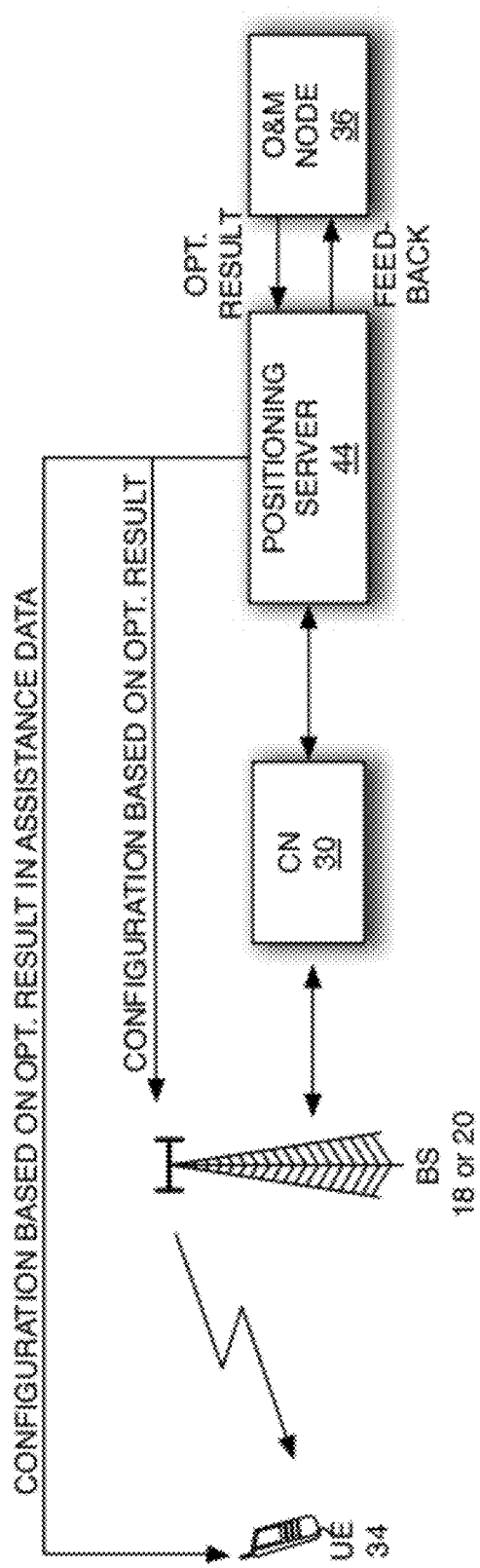
FIGS. 13 and 14 are block diagrams illustrating embodiments of positioning signal transmission planning and optimization in a wireless communication network.

With these optimization approaches in mind, FIG. 13 illustrates a centralized architecture proposed in one embodiment herein, for optimizing, re-optimizing, and tuning the positioning configuration of a wireless communication network 10. In particular, FIG. 13 illustrates an embodiment of a centralized architecture that provides for implementation and distribution of optimized positioning signaling configurations. The optimization problem to solve for can be any of the optimization problems defined in the above equations. The problem being solved defines the input/output, but also determines the necessary frequency of the solution update, i.e. how often it has to be solved (least often, e.g., once a year or when the network is reconfigured or when new nodes are introduced, versus most often, which may be daily).

In accordance with the illustration, the operations and maintenance node 36 is configured to generate initial values for the matrices $C_k$ and $J_k$ as described above. The same node is further configured to update one or both of these matrices based on feedback received from the positioning server 44. That feedback reflects, for example, positioning performance information regarding cells in the network. As one example, the feedback comprises a list of the tuples of the strongest interferers in the current network-wise positioning configuration for a considered RS (e.g., PRS or CRS) and the list of the associated relative values for each pair of cells.

The operations and maintenance node 36 uses the feedback to produce an optimized positioning configuration for each base station 18 and/or 20 and each respective cell 14 and/or 16. The optimized positioning configurations are communicated from the operations and maintenance node 36 to the positioning server 44. In turn, the positioning server 44 signals configuration updates to the base stations 18 or 20 and to the UEs 34, i.e., by including relevant configuration information in the positioning assistance data transmitted by the network 10 (as needed in view of the involved cells and corresponding neighbor cell lists).

When the time component is considered, the solution becomes a set of positioning configuration solutions taken over a certain time period and to be applied with a certain periodicity. The solution determination can account for frequency-assignment problems using frequency planning techniques known from GSM, for example.

In any case, the operations and maintenance node 36 determines positioning configurations according to its optimization processing and provides the determined configuration information the positioning server 44. In turn, the positioning server 44 is configured to distribute the relevant information to the UEs 34 (e.g., in the assistance data via LPP protocol) and to the base stations 18 and 20 (e.g., to eNodeBs via LPPa protocol). The information from the positioning server 44 to the UEs and eNodeBs may be signaled transparently to the core network nodes (which is the case, for example, for MME in the LTE positioning control plane). Similarly, the positioning server 44 may communicate with other entities in the network 10 to obtain measurement results and perform the calculations for UE positioning.

Assuming that the feedback to the operations and maintenance node 36 indicates inaccurate positionings, the operations and maintenance node 36 updates the optimization problem, e.g., by updating the values in the cost matrices $C_k$. The re-optimized positioning configuration then needs to be distributed throughout the network 10. In an LTE example, the positioning server 44 is an E-SMLC for the control plane, or an SLP (SUPL Location Platform) for the user plane, and distributions are handled in accordance with the interfaces defined for those entities.

As another example regarding more feedback details, one or more cells 14 or 16 are configured to maintain statistics regarding the quality of the obtained UE positions and the positioning measurements (e.g. RSTD for OTDOA) for the measured cells over a certain time for each positioning method. When the average QoS of the positioning service drops below a certain threshold after the last positioning configuration update and remains consistently unsatisfactory during a certain period, the serving cell and some neighbor cells may need to be reconfigured, depending on the statistical quality of per-cell measurements and the cells included in the position calculation.

Based on this knowledge and analysis, the feedback information is constructed and sent from the positioning server 44 to the operations and maintenance node 36. The feedback may comprise a list of the tuples of the strongest interferers in the current network-wise positioning configuration for a considered RS (e.g., PRS or CRS) and the list of the associated relative values for each pair of cells which are suspected to cause bad positioning performance. The relative values for cell i and cell j can, for example, be found as the average ratio of the SINRi and SINRj reported by a UE 34 to an eNodeB and also to the positioning server 44.

In re-optimizing the positioning configuration of the network 10, the operations and maintenance node 36 generates a new list, for example, that assigns reference signals to each antenna port 22 per cell (these assignments can and generally will include the multiple antenna ports 22 in multi-port cells and the single antenna ports 22 in single-port cells 16). In this manner, the configuration establishes which ports 22 are used at what times or in what pattern, for transmitting reference signals for use by the UEs 34 in making positioning-related measurements. The operations and maintenance node 36 also may incorporate a dynamic time component into the optimized configuration, e.g., by defining a set of configurations and a time ordering for their use (e.g., defining certain reference signal transmission patterns for use in a certain time interval or with a certain periodicity).

Figure 14:
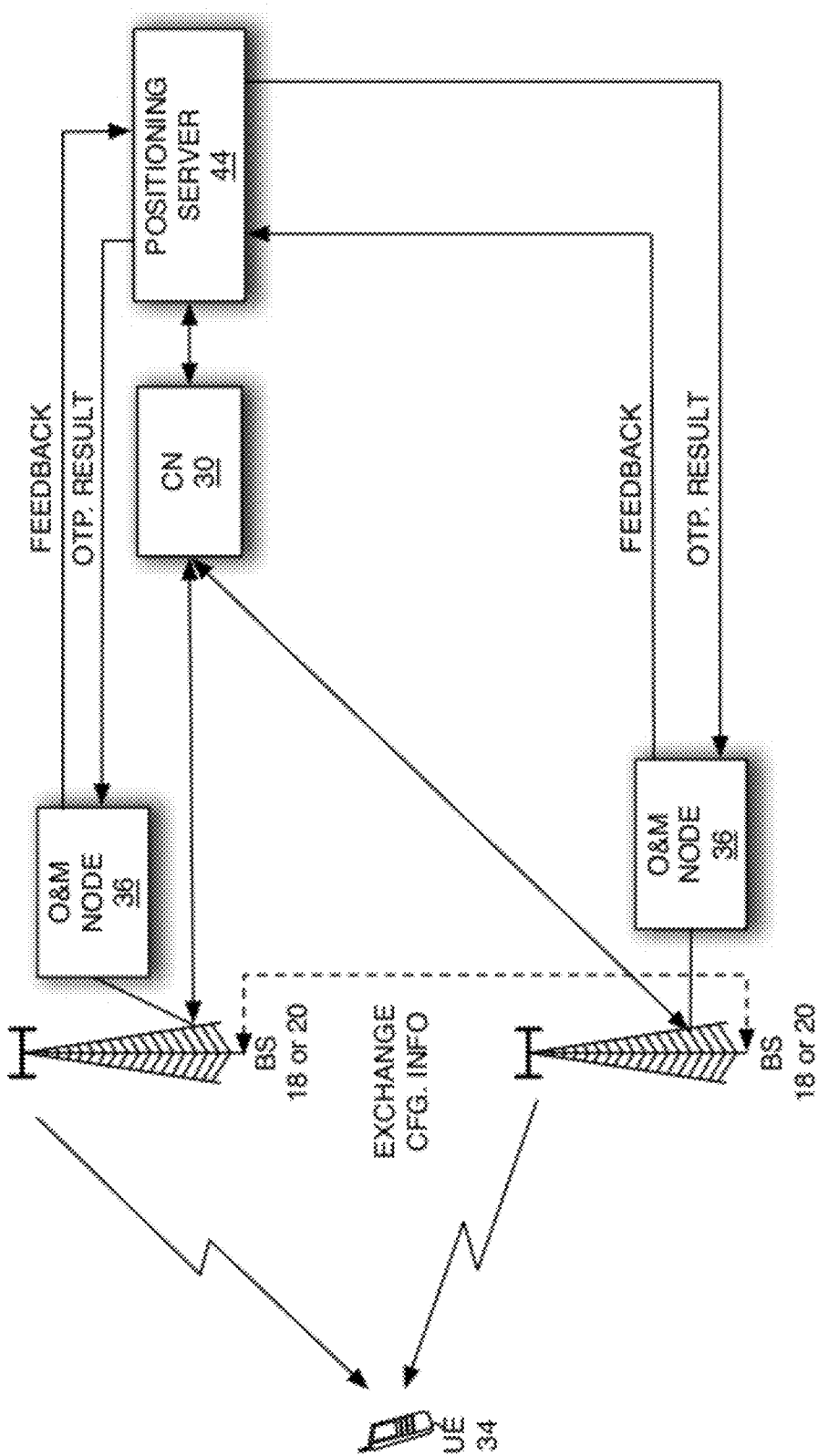

FIG. 14 illustrates another embodiment that uses a distributed architecture for positioning configuration optimization. Here the operation and maintenance node 36 is at least logically divided into per base station nodes (e.g., one per eNodeB). In a first scenario the positioning configuration optimization problem is solved locally for each base station 18 or 20 in the locally associated operations and maintenance node 36, and the configuration information is then exchanged between the base stations 18 or 20, e.g., between eNodeBs over the X2 interface.

Alternatively, in a second scenario the positioning configuration optimization problem is solved locally for each base station 18 or 20, and those results are sent back to the positioning server 44. The positioning server 44 uses the optimized configuration and sends corresponding feedback information (e.g., statistics indicating positioning performance obtained from the positioning configuration(s) in use). The localized operations and maintenance nodes 36 then use that feedback to update the optimized solution.

In both scenarios above the information exchanged between base stations or sent via feedback to the positioning server can be used for re-optimization, such as by updating the values of the corresponding cost matrices $C_k$ which can now be different for different base stations. The result of the optimization for each base station 18 or 20 is, for example, a new positioning configuration that defines the type of reference signals transmitted for use in positioning-related measurements by the UEs 34, the static, semi-static, or dynamic transmission patterns used for transmitting such signals. Notably, in one or more embodiments these patterns provide for reference signal transmission control on a per-antenna-port and per-cell basis.

Also notable in the second scenario, the localized operations and maintenance nodes 36 act as "local" solvers that may not have current knowledge of the positioning configurations used in neighboring cells 14 or 16, and thus may not have full visibility into how their local updates to the positioning configuration of their associated cell 14 or 16 affects the positioning performance obtainable in the neighboring cells 14 or 16. To account for this issue, the local solvers make assumptions for the neighboring cells based on historical data, for example. Such data relates to the cost matrices $C_k$ for example.

Further, the current configuration in neighbor cells may be requested either from the positioning server 44 or via X2 interface between base stations 18 or 20, or their local operations and maintenance node 36. In general, the current positioning configurations and/or the associated performance optimization metrics can be exchanged between neighboring cells 14 or 16.

One example metric is, for example, either the objective function value or the "cost" of the new local-cell positioning configuration, which describes the impact on the neighbor cell performance. If the impact is acceptable and inline with the neighbor cell "expectation," the neighbor cell may acknowledge the positioning configuration in the local cell. The base stations 18 or 20 also may exchange $C_k$ matrices to handshake (agree) on the $C_k$ matrices used by the local solvers in each cell.

Whether such centralized optimization approaches are used, the various embodiments taught herein provide a number of advantages. One advantage is that advanced antenna configurations are accounted for in reference signal transmission, such as by defining for a multi-port cell 14 which antenna port 22 is used for PRS transmission at which time in the cell 14. That definition may be static, semi-static, or dynamic, and in one or more embodiments the definition is encompassed in a larger pattern applied to two or more neighboring cells 14 or 16. These larger patterns are implemented by inter-base station coordination in one embodiment, and implemented by a centralized reference signal controller in another embodiment.

It will also be appreciated that the teachings herein readily apply to the use of relays within the wireless communication network 10. For example, the type and/or timing of the reference signals transmitted from one or more relay nodes can be coordinated with the base station's transmission, and that coordination can be extended across multiple cells.

A significant aspect of such coordination is the underlying teaching herein of multi-antenna muting patterns. That is, the time-wise control of which antennas 24 are used to transmit reference signals at what times within a given multi-port cell 14 can be viewed as the determination of reference signal muting patterns on a per antenna port basis, and these determinations can be made on a per cell basis or coordinated across cells. Further, the muting patterns in use can be blindly discovered by the UEs 34, or signaled to the UEs 34 by the network 10 using LPP for example, or using a protocol between the base stations 18 or 20 and the UEs 34.

More particularly, the teachings disclosed herein define PRS muting configurations as a function of the physical antenna port or CRS antenna port, and not simply as a function of cell ID and/or PRS antenna port. Further, although much of the example descriptions provided in this disclosure relate to control-plane positioning architectures, the teachings herein also apply to user-plane positioning architectures.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of performing positioning-related measurements in a wireless communication apparatus associated with a wireless communication network that includes one or more first cells each transmitting a first type of reference signals but not a second type of reference signals and one or more second cells each transmitting at least the second type of reference signals, said apparatus comprising:
    receiving a mix of reference signals, including one or more of the first type of reference signals from one or more of said first cells and one or more of the second type of reference signals from one or more of said second cells; and
    performing positioning-related measurements based on which a given positioning-related calculation is made, by performing those measurements at said wireless communication apparatus using said mix of reference signals;
    wherein said first type of reference signals comprises reference signals on which the wireless communication apparatus is capable of performing positioning-related measurements without measurement ambiguity even if those reference signals are transmitted from more than one antenna port at a time within a cell, and wherein said second type of reference signals comprises reference signals on which the wireless communication apparatus is capable of performing positioning-related measurements without measurement ambiguity only if those reference signals are transmitted from one antenna port at a time within a cell.

2. The method of claim 1, wherein said first type of reference signals comprises cell-specific reference signals, "CRS", that are transmitted to aid channel estimation while said second type of reference signals comprises positioning reference signals, "PRS", that are transmitted in defined positioning sub-frames explicitly for positioning-related measurements.

3. The method of claim 1, wherein said one or more first cells each transmit said first type of reference signals from more than one antenna port at a time, and wherein said step of performing positioning-related measurements includes said wireless communication apparatus performing separate measurement reporting for said first type of reference signals on a per antenna port basis.

4. The method of claim 1, wherein said mix of reference signals further includes one or more of the first type of reference signals, as received from one or more of said second cells, so that said method includes said wireless communication apparatus performing positioning-related measurements using the first type of reference signals as received from one or more of said first cells, the first type of reference signals as received from one or more of said second cells, and the second type of reference signals as received from one or more of said second cells.

5. The method of claim 1, wherein said first and second cells are distinguished in that each said first cell transmits using multiple antenna ports, and each said second cell transmits using a single antenna port, and wherein said step of performing positioning-related measurements includes, for any given one of said first cells, performing positioning-related measurements with respect to the first type of reference signals as transmitted from each one of said multiple antenna ports, so that positioning-related measurements are made separately with respect to each of said multiple antenna ports.

6. The method of claim 5, further comprising at least one of receiving positioning assistance data that explicitly or implicitly indicates whether given cells in the wireless communication network are among said first cells that do not transmit the second type of reference signals.

7. The method of claim 1, wherein said step of performing positioning-related measurements comprises determining a received signal timing for each reference signal considered in said mix of reference signals, and reporting said received signal timings, or received signal timing differences derived therefrom.

8. The method of claim 1, wherein said step of performing positioning-related measurements comprises determining time-difference-of-arrival between one or more first type of reference signals and one or more second type of reference signals.

9. The method of claim 1, further comprising receiving assistance data identifying whether a given cell in the wireless communication network is one of said first cells or one of said second cells.

10. The method of claim 1, further comprising blindly detecting whether a given cell in the wireless communication network does or does not transmit a positioning reference signal, to determine whether said given cell is one of said first cells or one of said second cells.

11. The method of claim 1, wherein performing the positioning-related measurements at said wireless communication apparatus using said mix of reference signals includes reporting positioning-related measurements on a per antenna port basis.

12. A wireless communication apparatus configured to perform positioning-related measurements in association with a wireless communication network that includes one or more first cells each transmitting a first type of reference signal but not a second type of reference signal and one or more second cells each transmitting at least the second type of reference signal, said method comprising:
    a transceiver configured to receive a mix of reference signals, including one or more of the first type of reference signals from one or more of said first cells, and one or more of the second type of reference signals from one or more of said second cells; and
    processing circuitry, including a reference signal measurement circuit, configured to perform positioning-related measurements based on which a given positioning-related calculation is made, by performing those measurements at said wireless communication apparatus using said mix of reference signals;

wherein said first type of reference signals comprises reference signals on which the wireless communication apparatus is capable of performing positioning-related measurements without measurement ambiguity even if those reference signals are transmitted from more than one antenna port at a time within a cell, and wherein said second type of reference signals comprises reference signals on which the wireless communication apparatus is capable of performing positioning-related measurements without measurement ambiguity only if those reference signals are transmitted from one antenna port at a time within a cell.

13. The wireless communication apparatus of claim 12, wherein said first type of reference signals comprises cell-specific reference signals, "CRS", that are transmitted to aid channel estimation while said second type of reference signals comprises positioning reference signals, "PRS", that are transmitted in defined positioning sub-frames explicitly for positioning-related measurements.

14. The wireless communication apparatus of claim 12, wherein said one or more first cells each transmit said first type of reference signal from more than one antenna port at a time, and wherein said wireless communication apparatus is configured perform separate measurement and reporting for said first type of reference signals on a per antenna port basis.

15. The wireless communication apparatus of claim 12, wherein said first and second cells are distinguished in that each said first cell transmits using multiple antenna ports, and each said second cell transmits using a single antenna port, and wherein said wireless communication apparatus is configured to perform positioning-related measurements with respect to the first type of reference signals as transmitted from each one of said multiple antenna ports, so that positioning-related measurements are made separately with respect to each of said multiple antenna ports.

16. The wireless communication apparatus of claim 15, wherein said wireless communication apparatus is further configured to receive positioning assistance data that explicitly or implicitly indicates whether given cells in the wireless communication network are among said first cells that do not transmit the second type of reference signals.

17. The wireless communication apparatus of claim 12, wherein said wireless communication apparatus is configured to perform said positioning-related measurements using said mix of reference signals by determining a received signal timing for each reference signal considered in said mix of reference signals, and reporting said received signal timings, or received signal timing differences derived from said received signal timings.

18. The wireless communication apparatus of claim 12, wherein said wireless communication apparatus is configured to perform said positioning-related measurements by determining time-difference-of-arrival between one or more of said first type of reference signals and one or more of said second type of reference signals, received in said mix.

19. The wireless communication apparatus of claim 12, wherein said wireless communication apparatus is configured to receive assistance data identifying whether a given cell in the wireless communication network is one of said first cells or one of said second cells.

20. The wireless communication apparatus of claim 12, wherein said wireless communication apparatus is configured to blindly detect whether a given cell in the wireless communication network does or does not transmit a positioning reference signal, to determine whether said given cell is one of said first cells or one of said second cells.

21. The wireless communication apparatus of claim 12, wherein said wireless communication apparatus is configured to substitute positioning-related measurements made with respect to reference signals of the first type in place of positioning-related measurements made with respect to reference signals of said second type, at times when transmission muting is applied to said reference signals of said second type in any given one of said second cells.

22. The wireless communication apparatus of claim 12, wherein said wireless communication apparatus is configured to receive different cell identification lists, with one of said cell identification lists used for identifying cells among said first cells and another one of said cell identification lists used for identifying cells among said second cells.

23. A wireless communication network comprising:
one or more first base stations, each first base station having multiple antenna ports for providing network service in a corresponding cell;
one or more second base stations, each second base station having a single antenna port for providing service in a corresponding cell; and
wherein each of said one or more first base stations is configured to transmit a first type of reference signals but not a second type of reference signals, and each of said one or more second base stations is configured to transmit both the first and the second types of reference signals, and wherein said first type of reference signals can be transmitted from more than one antenna port in a given cell without positioning-related measurement ambiguity and said second type of reference signals can be transmitted from only one antenna port at a time within a given cell without positioning-related measurement ambiguity.

24. The wireless communication network of claim 23, wherein said first type of reference signals comprises cell-specific reference signals, "CRS," and wherein said second type of reference signals comprises positioning reference signals, "PRS".

25. The wireless communication network of claim 24, wherein said PRS are transmitted by each of said second base stations at defined positioning measurement times, and wherein said first base stations are each configured to transmit said CRS from only one port in a given corresponding cell during said defined positioning measurement times and to otherwise transmit said CRS from multiple ports in said given corresponding cell.

26. The wireless communication network of claim 23, wherein at least said first base stations are configured to transmit different cell identification lists, with one of said cell identification lists identifying cells among said first cells and another one of said cell identification lists identifying cells among said second cells.

27. The wireless communication network of claim 23, wherein one or more of said first base stations are configured to transmit positioning assistance data, indicating that said one or more of said first base stations do not transmit said second type of reference signals.

28. A method of reference signal transmission in wireless communication network base station in a wireless communication network, said method comprising:
transmitting, in a cell associated with said wireless communication network base station, a first type of reference signals from any one or more of antenna ports in a plurality of antenna ports used for transmitting in said cell; and
transmitting, in said cell, a second type of reference signals from only one of said antenna ports at a time according to a port configuration that determines which one of the antenna ports is selected for use in transmitting the second type of reference signals at any given one of the transmission occasions that are defined for transmission of the second type of reference signals;

wherein said first type of reference signals can be transmitted without positioning-related measurement ambiguity from more than one antenna port at a time within said cell, and wherein said second type of reference signals can be transmitted without positioning-related measurement ambiguity from only one antenna port at a time within said cell.

29. The method of claim 28, further comprising dynamically changing which one of said antenna ports in said cell is selected for use in transmitting the second type of reference signals over one or more of said transmission occasions.

30. The method of claim 29, wherein said dynamically changing which one of said antenna ports in said cell is selected for use in transmitting said second type of reference signals comprises receiving signaling indicating a transmission pattern or muting sequence to use for selecting individual ones of said antenna ports for transmitting said second type of reference signals over said one or more transmission occasions.

31. The method of claim 28, further comprising controlling transmission of the first type of reference signals in said cell so as not to coincide with symbol times in any of said transmission occasions that are used for transmitting symbols comprising the second type of reference signals.

32. The method of claim 28, further comprising muting transmission of the second type of reference signals from any currently selected one of said antenna ports for a given transmission occasion, if muting information received or otherwise determined by said base station indicates that muting is to be applied to said transmission of said second type of reference signals for said given transmission occasion.

33. A wireless communication network base station configured for reference signal transmission in a wireless communication network, said wireless communication network base station comprising:

one or more transmitters and an associated plurality of transmit antenna ports for transmitting in a cell associated with said wireless communication network base station;

a transmit controller configured to control said one or more transmitters to transmit, in said cell, a first type of reference signals from any one or more of said antenna ports and to transmit, in said cell, a second type of reference signals from only one of said antenna ports at a time according to a port configuration that determines which one of the antenna ports is selected for use in transmitting the second type of reference signals at any given one of the transmission occasions that are defined for transmission of the second type of reference signals;

wherein said first type of reference signals can be transmitted without positioning-related measurement ambiguity from more than one antenna port at a time within said cell, and wherein said second type of reference signals can be transmitted without positioning-related measurement ambiguity from only one antenna port at a time within said cell.

34. The wireless communication network base station of claim 33, wherein said wireless communication network base station is configured to dynamically change which one of said antenna ports in said cell is selected for use in transmitting the second type of reference signals over one or more of said transmission occasions.

35. The wireless communication network base station of claim 34, wherein said wireless communication network base station is configured to dynamically change which one of said antenna ports in said cell is selected for use in transmitting said second type of reference signals responsive to receiving signaling indicating a transmission pattern or muting sequence to use for selecting individual ones of said antenna ports for transmitting said second type of reference signals over said one or more transmission occasions.

36. The wireless communication network base station of claim 33, wherein said transmit controller is further configured to control transmission of the first type of reference signals in said cell so as not to coincide with symbol times in any of said transmission occasions that are used for transmitting symbols comprising the second type of reference signals.

37. The wireless communication network base station of claim 33, wherein said wireless communication network base station is configured to mute transmission of the second type of reference signals from any currently selected one of said antenna ports for a given transmission occasion, if muting information received or otherwise determined by said base station indicates that muting is to be applied to said transmission of said second type of reference signals for said given transmission occasion.

* * * * *

UNITED STATES PATENT AND TRADEMARK OFFICE
CERTIFICATE OF CORRECTION

| | |
|---|---|
| PATENT NO. | : 8,682,389 B2 |
| APPLICATION NO. | : 13/120030 |
| DATED | : March 25, 2014 |
| INVENTOR(S) | : Siomina et al. |

Page 1 of 1

It is certified that error appears in the above-identified patent and that said Letters Patent is hereby corrected as shown below:

On the title page, item (75), under "Inventors", in Column 1, Line 1, delete "Selen," and insert -- Selén, --, therefor.

On title page 2, item (56), under "OTHER PUBLICATIONS", in Column 1, Line 3, delete "Oroject" and insert -- Project --, therefor.

On title page 2, item (56), under "OTHER PUBLICATIONS", in Column 1, Line 5, delete "XP050363330," and insert -- XP050393330, --, therefor.

On title page 2, item (56), under "OTHER PUBLICATIONS", in Column 1, Line 6, delete "paragaphs" and insert -- paragraphs --, therefor.

In the Specification

In Column 18, Line 20, delete "planning Optimizing" and insert -- planning. Optimizing --, therefor.

In the Claims

In Column 27, Line 25, in Claim 14, after "configured", insert -- to --.

Signed and Sealed this
Second Day of September, 2014

Michelle K. Lee
*Deputy Director of the United States Patent and Trademark Office*